US012574443B2

(12) United States Patent
Knight et al.

(10) Patent No.: US 12,574,443 B2
(45) Date of Patent: Mar. 10, 2026

(54) SYSTEM AND METHOD FOR USE OF REMOTE PROCEDURE CALL WITH A MICROSERVICES ENVIRONMENT

(71) Applicant: ORACLE INTERNATIONAL CORPORATION, Redwood Shores, CA (US)

(72) Inventors: Jonathan Knight, Istanbul (TR); Aleksandar Seovic, Lutz, FL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/228,456

(22) Filed: Apr. 12, 2021

(65) Prior Publication Data

US 2021/0329100 A1      Oct. 21, 2021

Related U.S. Application Data

(60) Provisional application No. 63/008,553, filed on Apr. 10, 2020.

(51) Int. Cl.
*H04L 29/06* (2006.01)
*G06F 8/35* (2018.01)
(Continued)

(52) U.S. Cl.
CPC ............ *H04L 67/133* (2022.05); *H04L 67/10* (2013.01); *H04L 67/51* (2022.05)

(58) Field of Classification Search
CPC .......... H04L 67/40; H04L 67/10; H04L 67/16
(Continued)

(56) References Cited

U.S. PATENT DOCUMENTS 4,882,674 A * 11/1989 Quint .................... G06F 13/387
                                                           719/330
5,687,373 A * 11/1997 Holmes ..................... H04L 9/40
                                                           719/328
(Continued)

FOREIGN PATENT DOCUMENTS

CN      110225131 A * 9/2019  ......... H04L 41/5041
CN      113076965 A * 7/2021
(Continued)

OTHER PUBLICATIONS

Oracle Introduces Helidon—A Lightweight JavaMicroservices Framework. Oct. 10, 2018. 11 Pages.*
(Continued)

*Primary Examiner* — Emmanuel L Moise
*Assistant Examiner* — Berhanu Shitayewoldetadik
(74) *Attorney, Agent, or Firm* — TUCKER ELLIS LLP

(57) ABSTRACT

In accordance with an embodiment, described herein is a system and method for supporting the use of remote procedure calls in microservices environments. A microservices (e.g., Helidon) environment provides a development framework that enables a software developer to create and use microservices. A remote procedure call (RPC) framework or component, such as, for example, a gRPC framework, enables client and server applications to communicate within the microservices environment, to build connected systems. In accordance with an embodiment, the gRPC framework enables communication between client and server applications associated with an in-memory data grid environment, such as, for example, an Oracle Coherence environment.

15 Claims, 12 Drawing Sheets

(51) Int. Cl.

| | |
|---|---|
| *G06F 8/41* | (2018.01) |
| *G06F 9/38* | (2018.01) |
| *G06F 9/44* | (2018.01) |
| *G06F 15/16* | (2006.01) |
| *G06F 21/53* | (2013.01) |
| *G06F 21/62* | (2013.01) |
| *H04L 15/16* | (2006.01) |
| *H04L 29/08* | (2006.01) |
| *H04L 67/10* | (2022.01) |
| *H04L 67/133* | (2022.01) |
| *H04L 67/51* | (2022.01) |

(58) Field of Classification Search
USPC ........................................................ 709/203
See application file for complete search history.

(56) References Cited

U.S. PATENT DOCUMENTS

| | | | | |
|---|---|---|---|---|
| 5,915,112 | A * | 6/1999 | Boutcher | G06F 9/44536 |
| | | | | 719/330 |
| 6,269,841 | B1 * | 8/2001 | Chen | F16L 55/041 |
| | | | | 138/40 |
| 6,918,053 | B1 | 7/2005 | Thatte | |
| 9,747,131 | B1 * | 8/2017 | Goldman | G06F 16/24556 |
| 10,212,041 | B1 * | 2/2019 | Rastogi | H04L 41/0893 |
| 10,693,734 | B2 * | 6/2020 | Rastogi | H04L 63/205 |
| 10,747,600 | B2 | 8/2020 | Neijenhuis | |
| 11,044,188 | B2 | 6/2021 | Martin | |
| 11,201,937 | B2 | 12/2021 | Carley | |
| 11,290,350 | B2 | 3/2022 | Chaloupka | |
| 11,504,029 | B1 * | 11/2022 | Martin | A61B 5/72 |
| 2002/0087657 | A1 * | 7/2002 | Hunt | H04L 67/306 |
| | | | | 709/217 |
| 2003/0056030 | A1 * | 3/2003 | Gao | H04L 67/02 |
| | | | | 719/330 |
| 2005/0021689 | A1 * | 1/2005 | Marvin | G06F 8/31 |
| | | | | 709/220 |
| 2005/0222946 | A1 | 10/2005 | Mulholland | |
| 2006/0215556 | A1 * | 9/2006 | Wu | H04W 4/12 |
| | | | | 370/230 |
| 2007/0112574 | A1 * | 5/2007 | Greene | H04W 12/126 |
| | | | | 709/201 |
| 2007/0236470 | A1 * | 10/2007 | Abanami | G06F 3/04886 |
| | | | | 345/173 |
| 2008/0115123 | A1 * | 5/2008 | Kelly | G06F 8/65 |
| | | | | 717/177 |
| 2008/0313649 | A1 * | 12/2008 | Tian | H04N 1/00885 |
| | | | | 719/315 |
| 2009/0033976 | A1 * | 2/2009 | Ding | G06F 3/126 |
| | | | | 358/1.15 |
| 2009/0150423 | A1 * | 6/2009 | Spanton | G06F 16/25 |
| | | | | 707/999.102 |
| 2010/0058330 | A1 * | 3/2010 | DeHaan | G06F 8/60 |
| | | | | 717/177 |
| 2010/0082472 | A1 * | 4/2010 | Cheung | G06Q 40/04 |
| | | | | 705/37 |
| 2010/0138521 | A1 * | 6/2010 | Dehaan | G06F 15/177 |
| | | | | 709/221 |
| 2011/0238792 | A1 * | 9/2011 | Phillips | G06F 9/44505 |
| | | | | 709/220 |
| 2012/0117145 | A1 * | 5/2012 | Clift | G06F 3/0481 |
| | | | | 345/522 |
| 2014/0237595 | A1 * | 8/2014 | Sridhara | G06F 21/566 |
| | | | | 709/224 |
| 2014/0372510 | A1 * | 12/2014 | Fausak | H04L 67/133 |
| | | | | 709/203 |
| 2014/0373098 | A1 * | 12/2014 | Fausak | H04L 63/102 |
| | | | | 726/4 |
| 2015/0242059 | A1 * | 8/2015 | Fausak | H04L 67/565 |
| | | | | 715/744 |
| 2015/0365480 | A1 * | 12/2015 | Soto | H04L 67/16 |
| | | | | 709/224 |

| | | | | |
|---|---|---|---|---|
| 2016/0294667 | A1 * | 10/2016 | Prabhakar | H04L 43/045 |
| 2016/0323188 | A1 * | 11/2016 | Guzman | H04L 41/0893 |
| 2016/0323197 | A1 * | 11/2016 | Guzman | G06F 9/5083 |
| 2017/0187597 | A1 * | 6/2017 | Nolan | H04L 43/10 |
| 2017/0187785 | A1 * | 6/2017 | Johnson | H04L 67/10 |
| 2017/0255642 | A1 * | 9/2017 | Ben Dayan | G06F 3/067 |
| 2017/0331812 | A1 * | 11/2017 | Lander | H04L 63/0815 |
| 2017/0331813 | A1 * | 11/2017 | Lander | H04L 63/0815 |
| 2017/0331829 | A1 * | 11/2017 | Lander | G06F 21/33 |
| 2018/0083835 | A1 * | 3/2018 | Cole | H04L 41/0246 |
| 2018/0084063 | A1 * | 3/2018 | Miedema | H04L 67/16 |
| 2018/0089011 | A1 * | 3/2018 | Basiri | G06F 11/3672 |
| 2018/0113799 | A1 * | 4/2018 | M.V. | G06F 11/3688 |
| 2018/0227974 | A1 * | 8/2018 | Puttagunta | H04W 76/14 |
| 2018/0234523 | A1 * | 8/2018 | Jose | H04L 41/06 |
| 2018/0276041 | A1 * | 9/2018 | Bansal | G06F 11/30 |
| 2018/0287903 | A1 * | 10/2018 | Joshi | H04L 43/062 |
| 2018/0307514 | A1 | 10/2018 | Koutyrine | |
| 2018/0309637 | A1 * | 10/2018 | Gill | H04L 41/22 |
| 2018/0316568 | A1 * | 11/2018 | Gill | H04L 41/0893 |
| 2018/0316780 | A1 * | 11/2018 | Baird | G06F 9/547 |
| 2019/0042339 | A1 * | 2/2019 | Doshi | G06F 9/45558 |
| 2019/0045037 | A1 * | 2/2019 | Sukhomlinov | H04L 69/22 |
| 2019/0089809 | A1 * | 3/2019 | Theebaprakasam | H04L 67/32 |
| 2019/0102162 | A1 * | 4/2019 | Pitre | H04L 63/0815 |
| 2019/0123970 | A1 * | 4/2019 | Rastogi | H04L 63/205 |
| 2019/0179297 | A1 * | 6/2019 | Kuroda | G06N 20/00 |
| 2019/0238598 | A1 * | 8/2019 | Mohamad Abdul | |
| | | | | H04L 63/0807 |
| 2019/0243547 | A1 * | 8/2019 | Duggal | G06F 3/0619 |
| 2019/0243688 | A1 * | 8/2019 | Karmarkar | G06F 9/546 |
| 2019/0243702 | A1 * | 8/2019 | Shilane | G06F 11/0709 |
| 2019/0306138 | A1 * | 10/2019 | Carru | H04L 9/3247 |
| 2019/0306173 | A1 * | 10/2019 | Reddy | H04L 9/0637 |
| 2019/0347168 | A1 | 11/2019 | Giannetti | |
| 2019/0356736 | A1 * | 11/2019 | Narayanaswamy | |
| | | | | G06F 11/2092 |
| 2019/0369987 | A1 * | 12/2019 | Chandrasekhar | G06F 9/546 |
| 2019/0377620 | A1 | 12/2019 | Neijenhuis | |
| 2020/0007615 | A1 * | 1/2020 | Brebner | G06F 9/542 |
| 2020/0034272 | A1 * | 1/2020 | Tunnicliffe | G06F 21/52 |
| 2020/0110438 | A1 * | 4/2020 | Brubacher | G06F 3/011 |
| 2020/0110584 | A1 * | 4/2020 | Irimescu | G06F 8/30 |
| 2020/0112487 | A1 * | 4/2020 | Inamdar | H04L 67/14 |
| 2020/0112844 | A1 * | 4/2020 | Greenberg | H04L 67/16 |
| 2020/0117525 | A1 * | 4/2020 | Kachare | G06F 13/4221 |
| 2020/0137125 | A1 * | 4/2020 | Patnala | G06F 21/64 |
| 2020/0228418 | A1 | 7/2020 | Chaloupka | |
| 2020/0236278 | A1 * | 7/2020 | Yeung | H04N 21/44016 |
| 2020/0322444 | A1 | 10/2020 | Stefanko | |
| 2020/0349672 | A1 * | 11/2020 | Cochran | G06T 15/08 |
| 2020/0351332 | A1 * | 11/2020 | Palladino | H04L 67/10 |
| 2020/0366587 | A1 * | 11/2020 | White | G06F 11/0709 |
| 2020/0394930 | A1 * | 12/2020 | Barab | G09B 5/02 |
| 2021/0075877 | A1 * | 3/2021 | Miedema | H04L 67/288 |
| 2021/0135971 | A1 | 5/2021 | Martin | |
| 2021/0176326 | A1 | 6/2021 | Carley | |

FOREIGN PATENT DOCUMENTS

| | | | | |
|---|---|---|---|---|
| WO | WO-03030014 A1 * | 4/2003 | | G06F 9/548 |
| WO | WO-2009018838 A1 * | 2/2009 | | H05H 1/34 |
| WO | WO-2018200757 A1 * | 11/2018 | | H04L 41/0893 |
| WO | WO-2019228515 A1 * | 12/2019 | | H04L 67/40 |
| WO | 2021137692 | 7/2021 | | |

OTHER PUBLICATIONS

Oracle Introduces Helidon—A Lightweight JavaMicroservices Framework. Oct. 10, 2018. 11 Pages. (Screenshot).*
European Patent Office, International Searching Authority, International Search Report and Written Opinion dated Jul. 19, 2021 for International Application No. PCT/US21/27298 , 15 pages.
Munaf, Raja Mubashir et al., "Microservices Architecture: Challenges and Proposed Conceptual Design", 2019 International Conference on Communication Technologies (ComTech 2019), © 2019 IEEE, pp. 82-87.

(56) References Cited

OTHER PUBLICATIONS

United States Patent and Trademark Office, Office Communication dated Jul. 1, 2022 for U.S. Appl. No. 17/230,581 , 24 pages.

Kralik, Matej "Integration of MicroProfile LRA with the Axon framework" Master's Thesis, Masaryk University Faculty of Informatics, Brno, Fall 2019 , 103 pages.

Redlich, Michael "Oracle Introduces Helidon—A Lightweight Java Microservices Framework" published Oct. 10, 2018 ,retrieved from: <https://www.infoq.com/news/2018/10/oracle-introduces-helidon/> on Jul. 12, 2022, 9 pages.

United States Patent and Trademark Office, Office Communication dated Jan. 7, 2022 for U.S. Appl. No. 17/230,581 , 20 pages.

United States Patent and Trademark Office, Office Communication dated Apr. 10, 2024 for U.S. Appl. No. 17/230,581 , 30 pages.

United States Patent and Trademark Office, Office Communication dated May 4, 2023 for U.S. Appl. No. 17/230,581 , 28 pages.

United States Patent and Trademark Office, Office Communication dated Jan. 18, 2023 for U.S. Appl. No. 17/230,581 , 25 pages.

United States Patent and Trademark Office, Office Communication dated Aug. 13, 2024 for U.S. Appl. No. 17/230,581 , 34 pages.

United States Patent and Trademark Office, Notice of Allowance and Fee(s) Due dated Mar. 14, 2025 for U.S. Appl. No. 17/230,581, 7 pages.

* cited by examiner

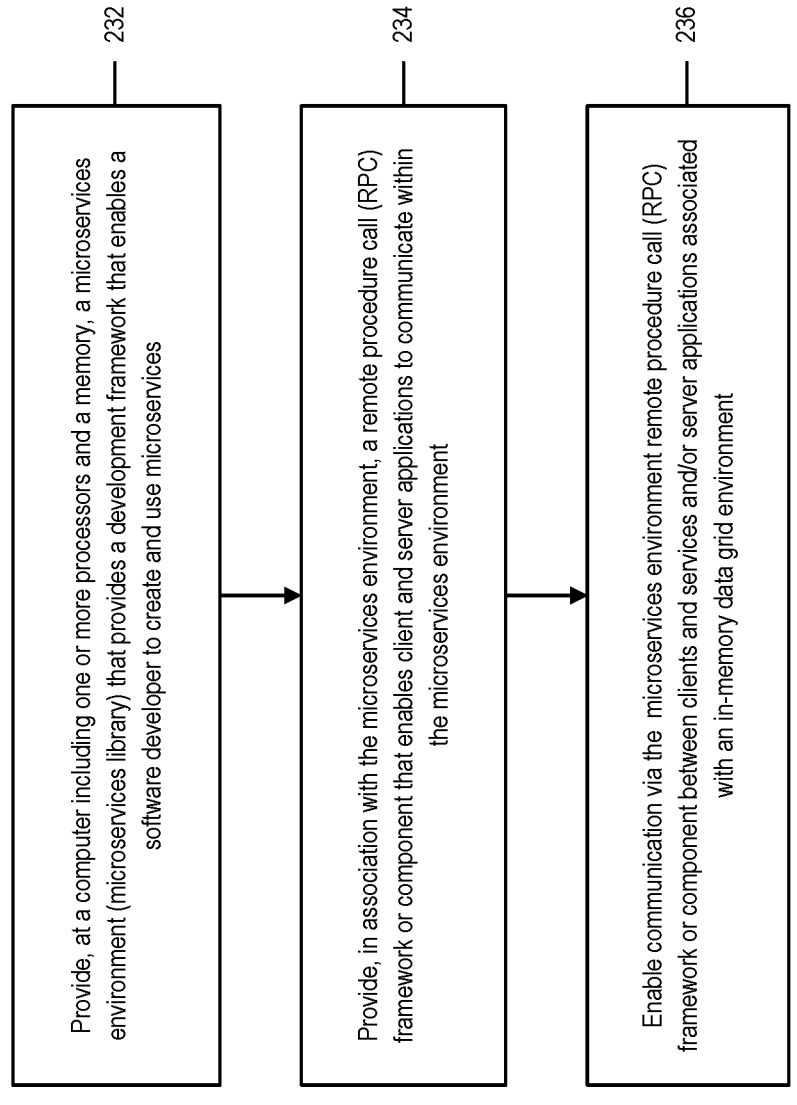

Provide, at a computer including one or more processors and a memory, a microservices environment (microservices library) that provides a development framework that enables a software developer to create and use microservices

232

Provide, in association with the microservices environment, a remote procedure call (RPC) framework or component that enables client and server applications to communicate within the microservices environment

234

Enable communication via the microservices environment remote procedure call (RPC) framework or component between clients and services and/or server applications associated with an in-memory data grid environment

SYSTEM AND METHOD FOR USE OF REMOTE PROCEDURE CALL WITH A MICROSERVICES ENVIRONMENT

COPYRIGHT NOTICE

CLAIM OF PRIORITY

This application claims the benefit of priority to U.S. Provisional Application titled "SYSTEM AND METHOD FOR USE OF REMOTE PROCEDURE CALL WITH A MICROSERVICES ENVIRONMENT", Application No. 63/008,553, filed Apr. 10, 2020, which application is herein incorporated by reference.

TECHNICAL FIELD

Embodiments described herein are generally related to cloud computing and other computing environments, software development, and microservice architectures, and are particularly directed to systems and methods for supporting the use of remote procedure call (e.g., gRPC) in microservices environments.

BACKGROUND

Microservice architectures have become popular for developing software applications to be provided in cloud computing environments as cloud services. Such environments can present a software application as a collection of loosely-coupled services that are independently deployable and communicate with one another over a network.

SUMMARY

In accordance with an embodiment, described herein is a system and method for supporting the use of remote procedure calls in microservices environments. A microservices (e.g., Helidon) environment provides a development framework that enables a software developer to create and use microservices. A remote procedure call (RPC) framework or component, such as, for example, a gRPC framework, enables client and server applications to communicate within the microservices environment, to build connected systems. In accordance with an embodiment, the gRPC framework enables communication between client and server applications associated with an in-memory data grid environment, such as, for example, an Oracle Coherence environment.

BRIEF DESCRIPTION OF THE DRAWINGS

FIG. 12 illustrates a method for the use of gRPC in a microservices environment, in accordance with an embodiment.

DETAILED DESCRIPTION

As described above, microservice architectures have become popular for developing software applications to be provided in cloud computing environments as cloud services. Such environments can present a software application as a collection of loosely-coupled services that are independently deployable and communicate with one another over a network, in the manner of a service-oriented architecture.

Software development frameworks such as Helidon assist in the development of microservices. For example, Helidon provides both Standard Edition (SE) and MicroProfile (MP) programming models or environments, each of which offers a collection of software libraries that can be used to provide a software developer with a foundation upon which to create a microservice, including features such as configuration, security, and web server functionality.

Technical advantages provided by such environments include that they alleviate the need for the software developer to program according to a particular tooling or deployment model, and enables the running of microservices without the need for an application server. The microservice libraries can interoperate with other software development, deployment, and monitoring tools such as, for example, Docker, Kubernetes, Prometheus, or OpenTracing.

Microservices Environment (Helidon)

Figure 1:
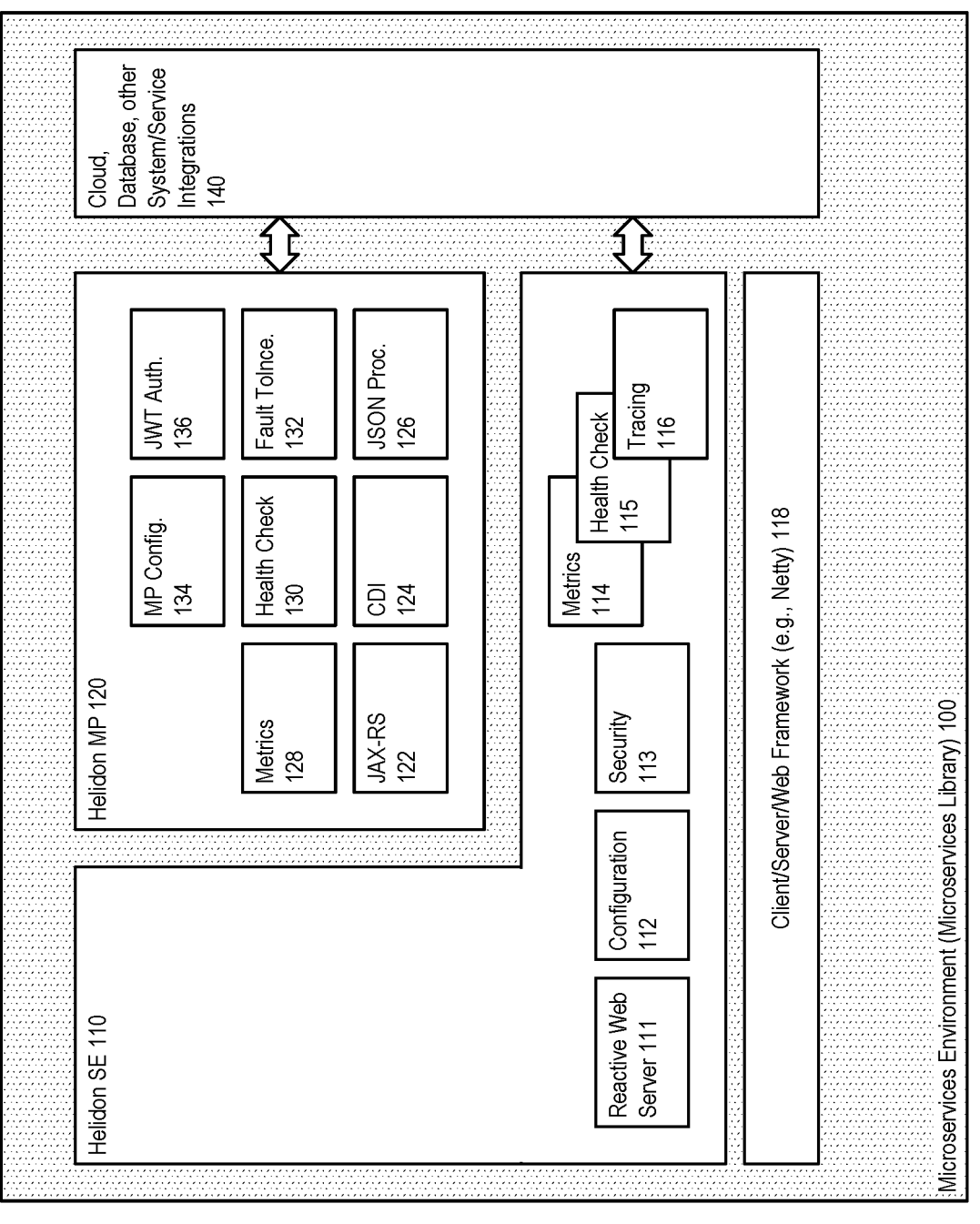
FIG. 1 illustrates an example microservices environment that provides a development framework, such as, for example, Helidon, in accordance with an embodiment.

FIG. 1 illustrates an example microservices environment that provides a development framework, such as, for example, Helidon, in accordance with an embodiment.

As illustrated in FIG. 1, in accordance with an embodiment, a microservices environment (microservices library) 100, which can be provided as one or more software libraries, such as for example Helidon libraries, offers both Helidon SE and Helidon MP programming models or environments.

In accordance with an embodiment, the components and processes illustrated in FIG. 1, and as further described herein with regard to various other embodiments, can be provided as software or program code executable by a computer system or other type of processing device. For example, in accordance with an embodiment, the components and processes described herein can be provided by a cloud computing system, or other suitably-programmed computer system.

In accordance with an embodiment, a Helidon SE environment 110 can include various libraries, APIs, or other components, such as, for example, a reactive web server 111, which provides an asynchronous and reactive API for creating web applications; a configuration API 112, which provides a Java API to load and process configuration properties in key/value form into a config object which an application can then use to retrieve config data; and a security component 113, which provides authentication, authorization, and outbound security; and can also include metrics 114, health check 115, and tracing 116 or other components.

In accordance with an embodiment, a Helidon MP environment 120 can include various libraries, APIs, or other components, such as, for example, JAX-RS 122, CDI 124, JSON-P 126, metrics 128, health check 130, fault tolerance 132, MicroProfile configuration 134, and JWT authentication 136 components. The web server can be provided by a non-blocking client/server/web framework 118, such as, for example, Netty. The microservices environment can also enable interactions with cloud, database, or other systems or services 140.

Helidon Standard Edition (SE)

Figure 2:
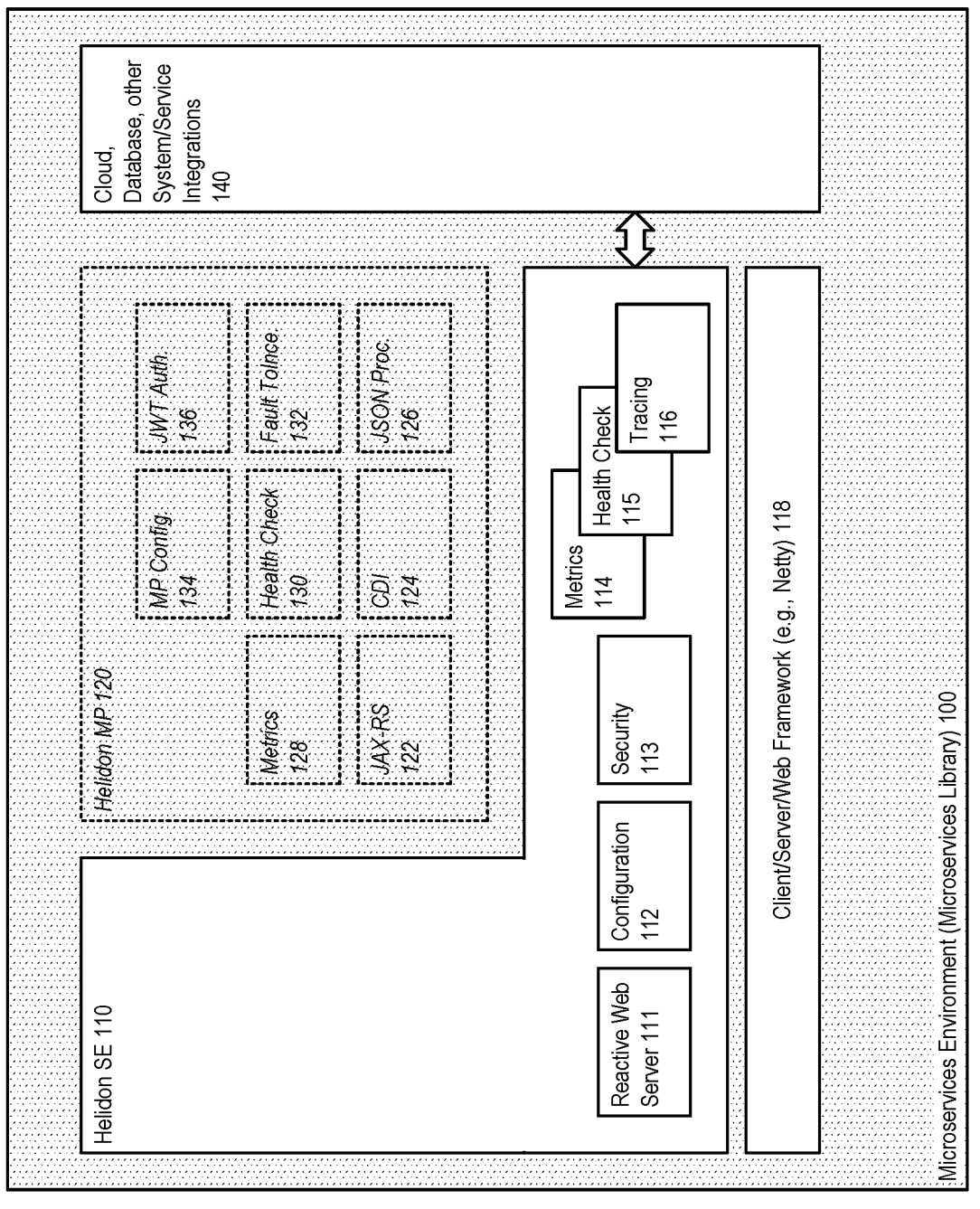
FIG. 2 illustrates an example Helidon SE microservices environment, in accordance with an embodiment.

FIG. 2 illustrates an example Helidon SE microservices environment, in accordance with an embodiment.

As illustrated in FIG. 2, in accordance with an embodiment, a Helidon SE environment supports a functional programming style that uses the web server, security and configuration components directly; provides the software developer with transparency and control; and supports Java features such as reactive streams, and asynchronous and functional programming. A Helidon SE environment provides a framework by which the software developer can build lightweight reactive microservices.

Helidon MicroProfile (MP)

Figure 3:
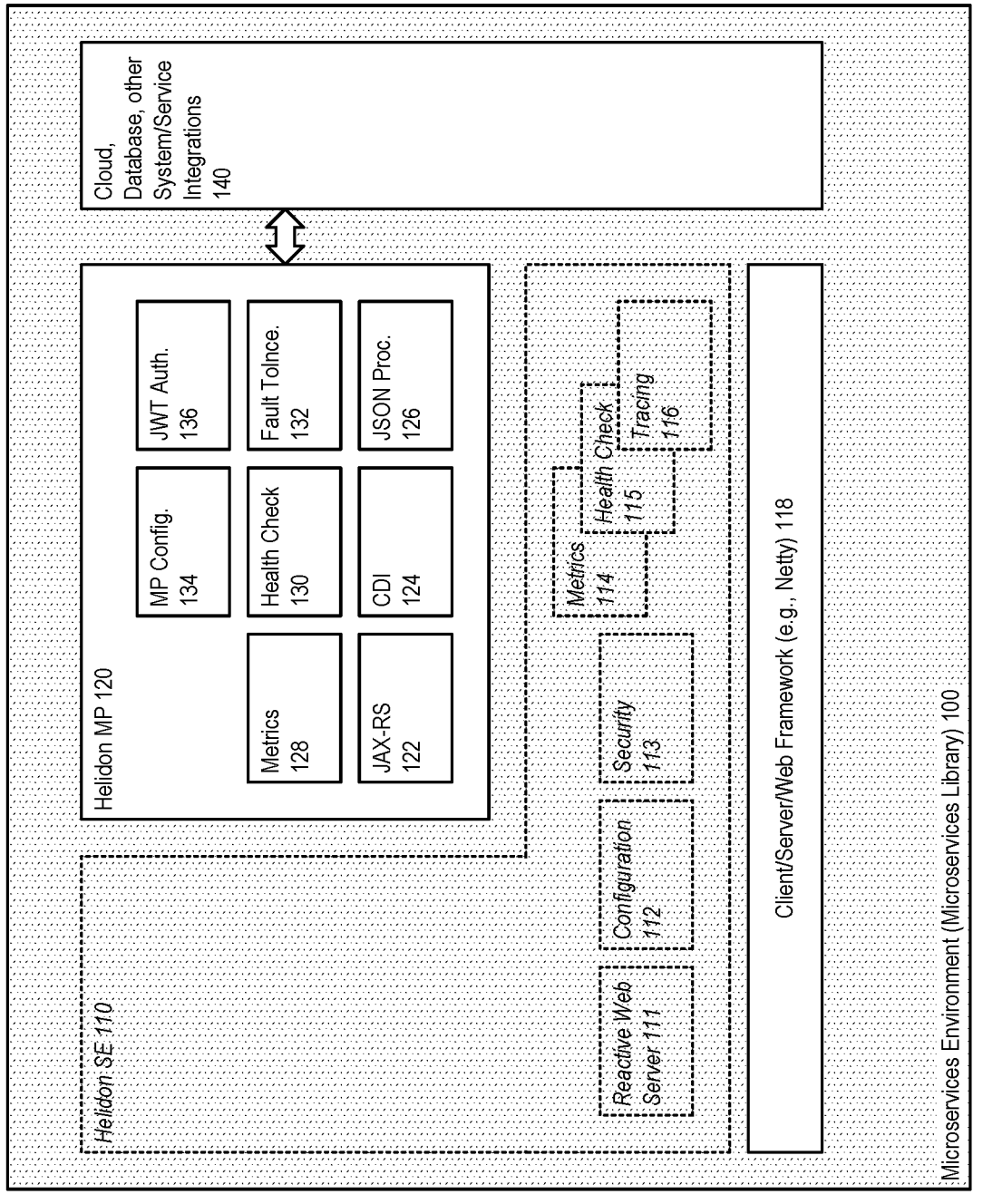
FIG. 3 illustrates an example Helidon MP microservices environment, in accordance with an embodiment.

FIG. 3 illustrates an example Helidon MP microservices environment, in accordance with an embodiment.

As illustrated in FIG. 3, in accordance with an embodiment, a Helidon MP environment supports a more declarative programming style, through the use of a MicroProfile family of APIs built on top of the Helidon libraries. A MicroProfile definition (for example, as specified by the Eclipse MicroProfile project) can be used to support application portability across multiple MicroProfile runtimes.

Integration with Cloud, Database, or other Systems/Services

Figure 4:
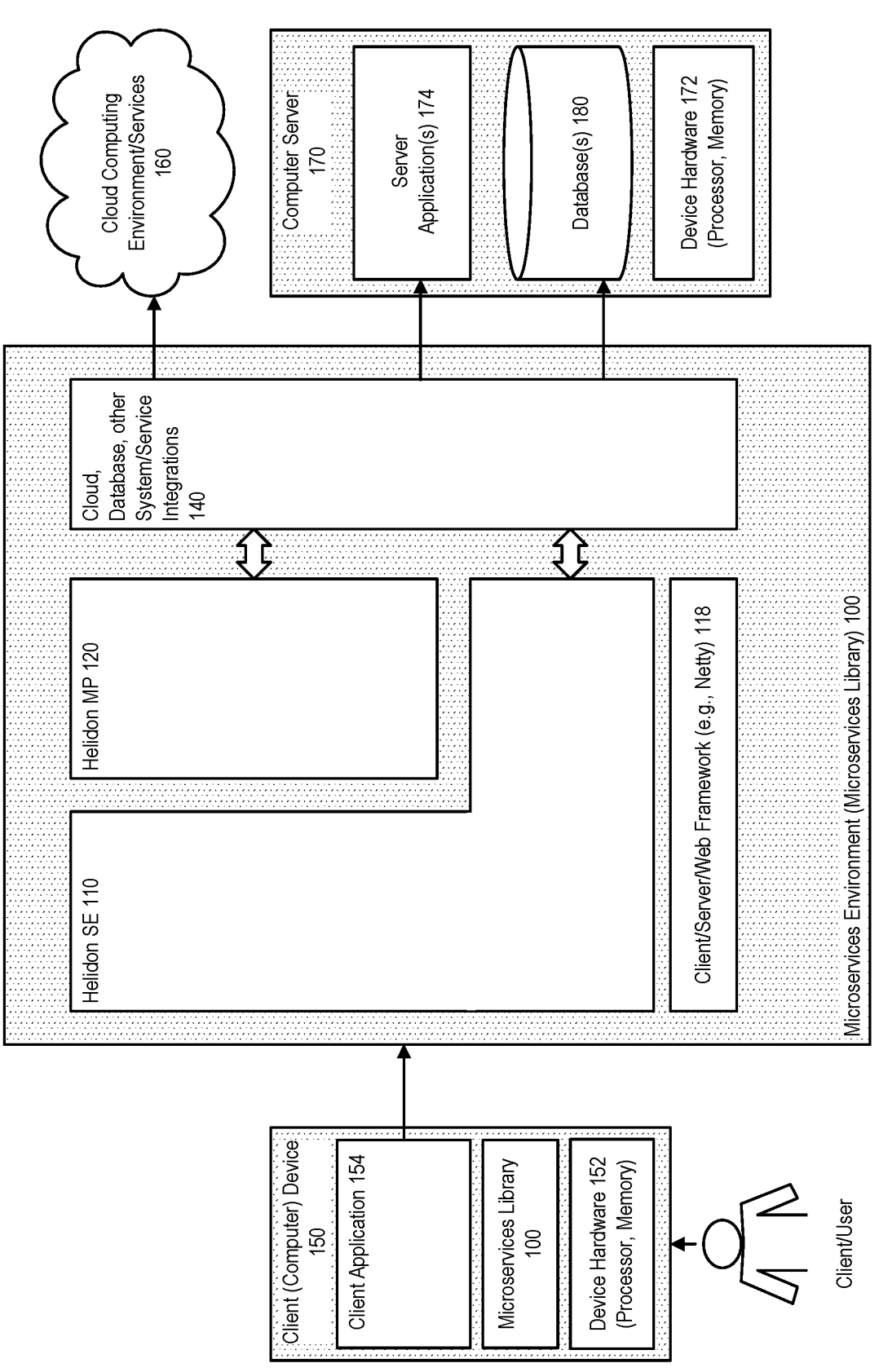
FIG. 4 illustrates an example microservices environment that enables one or more cloud, database, or other integrations, in accordance with an embodiment.

FIG. 4 illustrates an example microservices environment that enables one or more cloud, database, or other integrations, in accordance with an embodiment.

As illustrated in FIG. 4, in accordance with an embodiment, a microservices environment can enable a client (computer) device 150, having a device hardware 152 and client application 154, to interact with, for example, one or more cloud 160, server 170, 172, 174, database 180, or other cloud or on-premise systems or services.

For example, in accordance with an embodiment, when used together with an enterprise application environment, microservices can be used to interface with, connect, transform, or surface data from various enterprise application software products, such as, for example, and Oracle Fusion Applications environment; or communicate with enterprise server applications, databases, or other environments, such as, for example, an Oracle Database environment, or an Oracle Coherence environment.

Database Clients for use with Microservices Environments

In accordance with an embodiment, microservices environments such as Helidon SE can be used to develop non-blocking reactive web server implementations. In such environments, a smaller number of threads can handle larger loads due to the reactive nature of the implementation. However, if the web server, or a client application, needs to communicate with a database using, for example, JDBC, which operates in a blocking manner, this can require locking a thread in the reactive web server or client application, which can lead to performance problems with reactive applications.

In accordance with an embodiment, a microservices environment such as, for example, Helidon SE, can include a database client and database client API that provides a unified, reactive API for communicating, accessing, retrieving data, and generally working with databases in a non-blocking manner. The database client can operate with a database driver, and can include a thread pool and control any blocking of threads, while the database client API is itself used by the software developer in a non-blocking manner, for example to incorporate use of a blocking JDBC driver in a reactive client application. Since the database client performs database operations only when requested, the database client reduces backpressure; while also supporting features such as metrics, tracing, health, and security.

Figure 5:
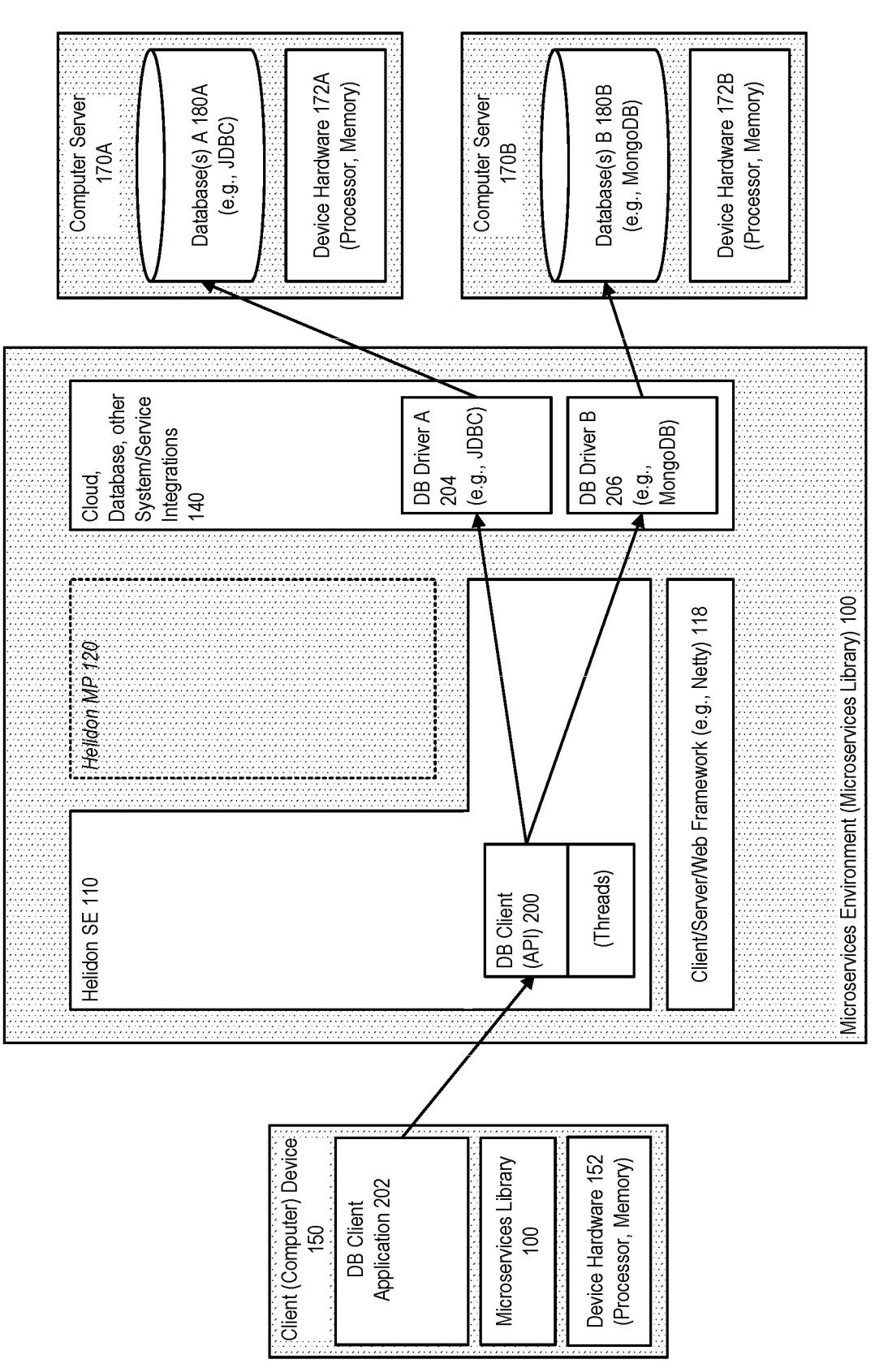
FIG. 5 illustrates the use of a database client in a microservices environment, in accordance with an embodiment.

FIG. 5 illustrates the use of a database client in a microservices environment, in accordance with an embodiment.

As illustrated in FIG. 5, in accordance with an embodiment, the database client 200 can operate with a variety of database drivers (for example, a JDBC driver 204, or a MongoDB Reactive Streams Java Driver 206), to enable access by a client application 202, to one or more database environments; and can operate similarly for both SQL and NoSQL database, so that CRUD operations can be supported by the API regardless of whether the database used at the backend is, for example, an Oracle JDBC database, or a MongoDB database.

In accordance with an embodiment, by moving native query code to configuration files, the database client allows a client application to use another database by changing the configuration associated with the database client. For example, a database client can be configured with:

source: jdbc or mongodb connection: database connection parameters statements: named statements when used In accordance with an embodiment, the database client API can provide methods to run statements with parameters and to retrieve statement execution results. Ordered or named parameters can be indicated as ? or <name> respectively in a SQL statement, for example:

SELECT name FROM Pokemons WHERE id=?

SELECT name FROM Pokemons WHERE id=:id

In accordance with an embodiment, statements can be executed by calling an execute( ) method after statement parameters are set, which returns CompletionStage<R> where R is the statement execution result. The following example illustrates a JDBC query with ordered parameters that does not run in the transaction:

```
dbClient.execute(exec -> exec
    .createQuery("SELECT name FROM Pokemons WHERE id = ?")
    .params(1)
    .execute( )
);
```

While the following example illustrates a JDBC query with named parameters that does run in the transaction:

```
dbClient.inTransaction(tx -> tx
    .createQuery("SELECT name FROM Pokemons WHERE id = :id")
    .addParam("id", 1)
    .execute( )
);
```

Figure 6:
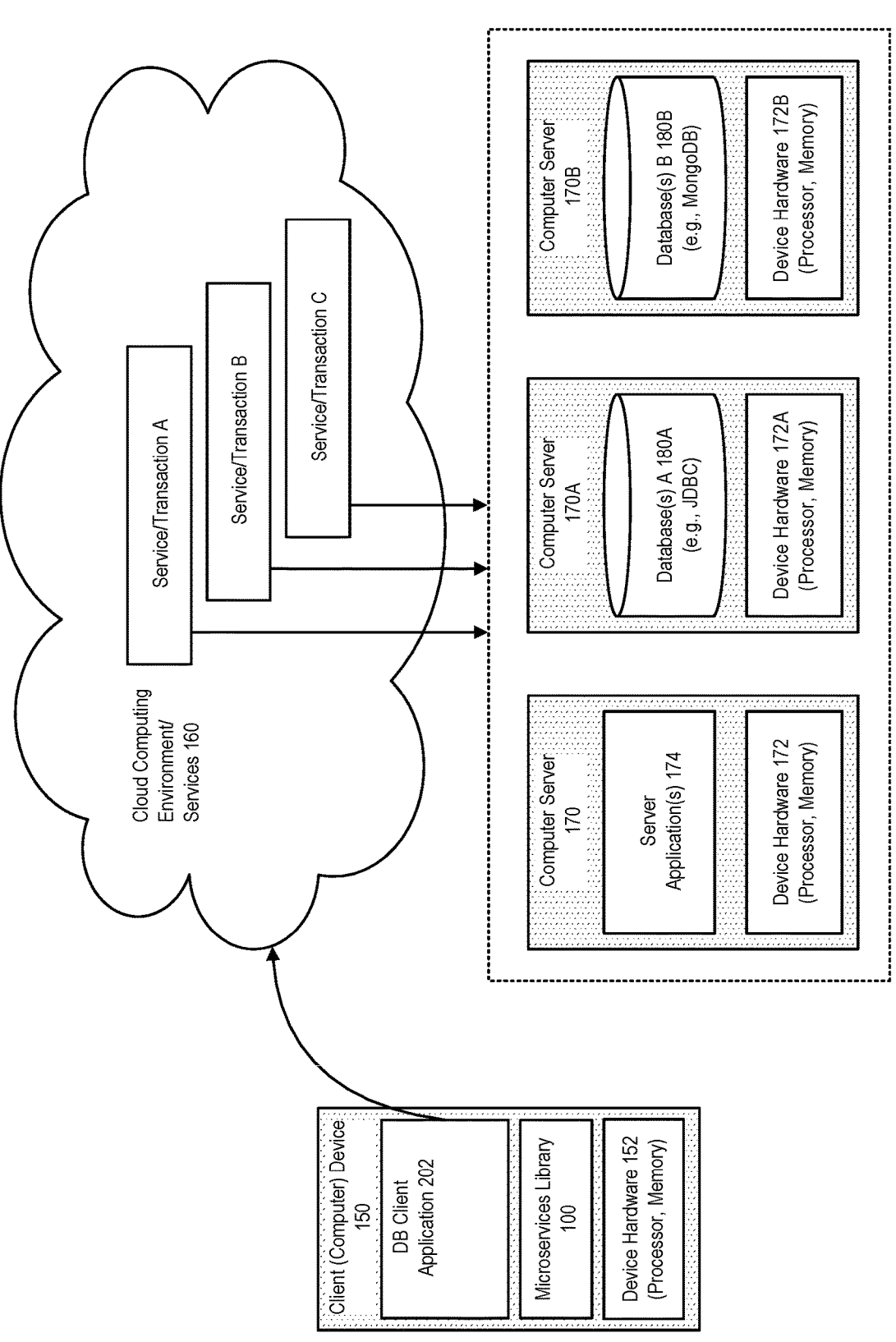
FIG. 6 further illustrates the use of a database client in a microservices environment, in accordance with an embodiment.

FIG. 6 further illustrates the use of a database client in a microservices environment, in accordance with an embodiment.

As illustrated in FIG. 6, in accordance with an embodiment, a microservices environment (microservices library) enables access by client applications, such as database clients as described above, to communicate with microservices or interact with cloud, database, or other systems or services, for purposes of accessing data, processing transactions, or performing other operations associated with those systems or services.

Support for Remote Procedure Call (RPC)

In accordance with an embodiment, a microservices (e.g., Helidon) environment can support the use of a remote procedure call (RPC) framework or component, such as for example gRPC, which enables client and server applications to communicate within the microservices environment, to build connected systems.

Figure 7:
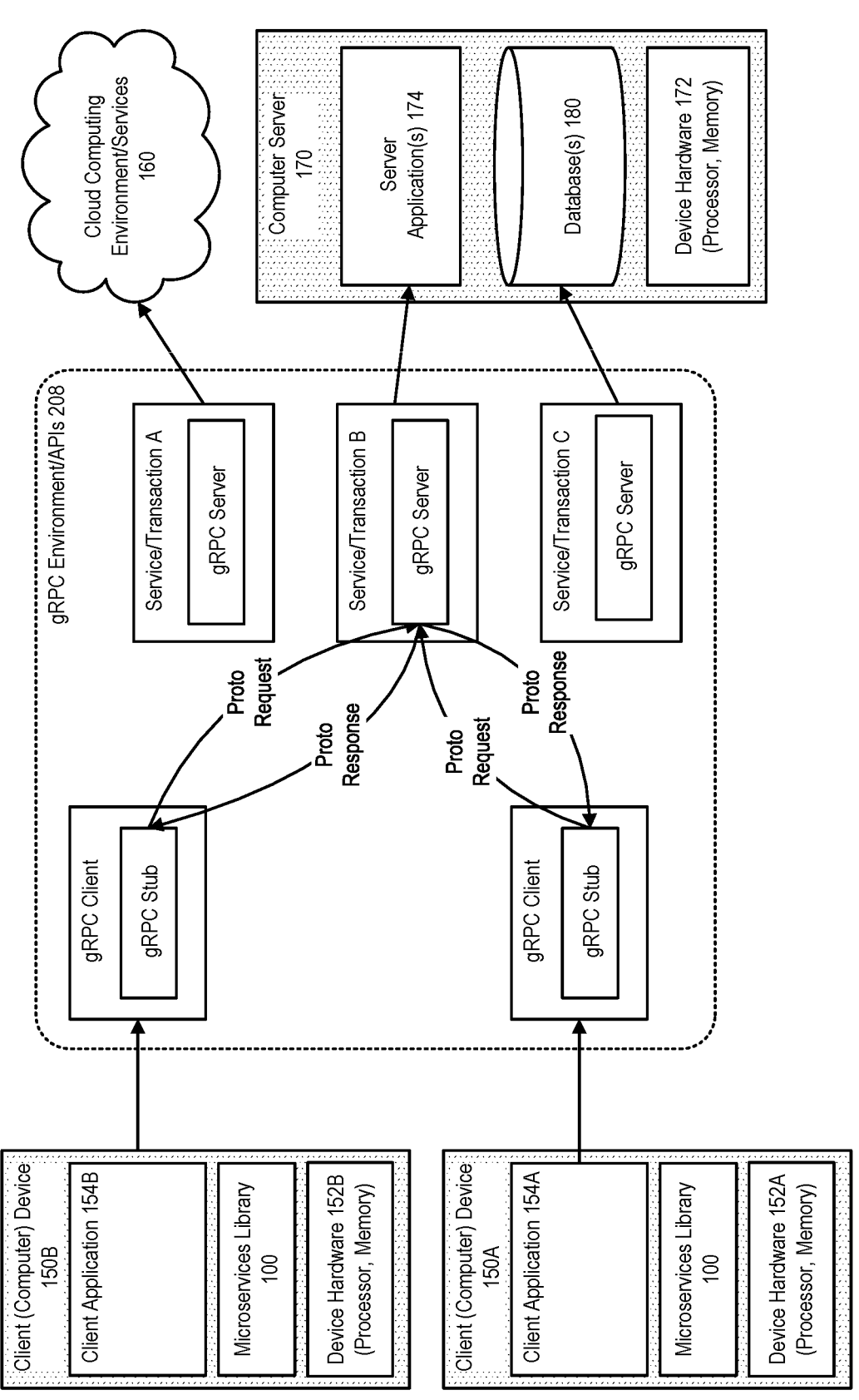
FIG. 7 illustrates the use of a remote procedure call framework, such as a gRPC framework, in a microservices environment, in accordance with an embodiment.

FIG. 7 illustrates the use of a remote procedure call framework, such as a gRPC framework, in a microservices environment, in accordance with an embodiment.

As illustrated in FIG. 7, in accordance with an embodiment, a gRPC framework provides an environment or APIs 208 that enables connection of services, with support for advanced features such as load balancing, tracing, health checking, and authentication.

Generally described, the gRPC framework uses protocol buffers as an Interface Definition Language (IDL) and message interchange format; and enables definition of a service and methods that can be called remotely. A computer server runs a gRPC server (GrpcServer) to handle client calls, via a local object (stub) at the client, which enables the client application to directly call a method on a server application as if it were a local object. Clients and servers can communicate with each other in a variety of different types of environments and supported languages, such as, for example, Java, Ruby, Android, Swift, or other types of languages.

In accordance with an embodiment, gRPC uses protocol buffers, which can be defined by a proto file (e.g., a text file with a .proto extension) as a mechanism for serializing structured data. Protocol buffer data is structured as messages that contain a series of name-value pairs or fields. A software developer can use a protocol buffer compiler (protoc) to generate data classes in a preferred language from the proto definition. The resultant class can then be used in a software application to populate, serialize, and retrieve protocol buffer messages.

In accordance with an embodiment, gRPC allows definition of various different types of service methods, such as, for example: unary RPC methods, wherein a client sends a single request to a server and receives a single response; server streaming RPC methods, wherein a client sends a request to a server and receives a stream of messages, and wherein gRPC guarantees message ordering within each RPC call; client streaming RPC methods, wherein a client writes a sequence of messages and sends those messages to a server; and then waits for the server to return a response, and wherein gRPC guarantees message ordering within each RPC call; or bidirectional streaming RPC methods, wherein both client and server send a sequence of messages using a read-write stream, and wherein the two streams operate independently, so that clients and servers can read and write in whichever order it is preferred.

In accordance with an embodiment, a service definition enables gRPC to provide protocol buffer compiler plugins that generate client-side and server-side code, which the gRPC application can call as APIs on the client side, and implement as a corresponding API on the server side.

On the server side, the server implements the methods declared by the service and provides a gRPC server to handle client calls, including decoding incoming requests, executing service methods, and encoding service responses.

On the client side, the client uses its local object (stub) that implements the same methods as the service, wherein the client can call those methods on the local object, wrapping the parameters for the call in an appropriate protocol buffer message type, which is then provided by gRPC as requests to the server.

RPC with Microservices Environments

Figure 8:
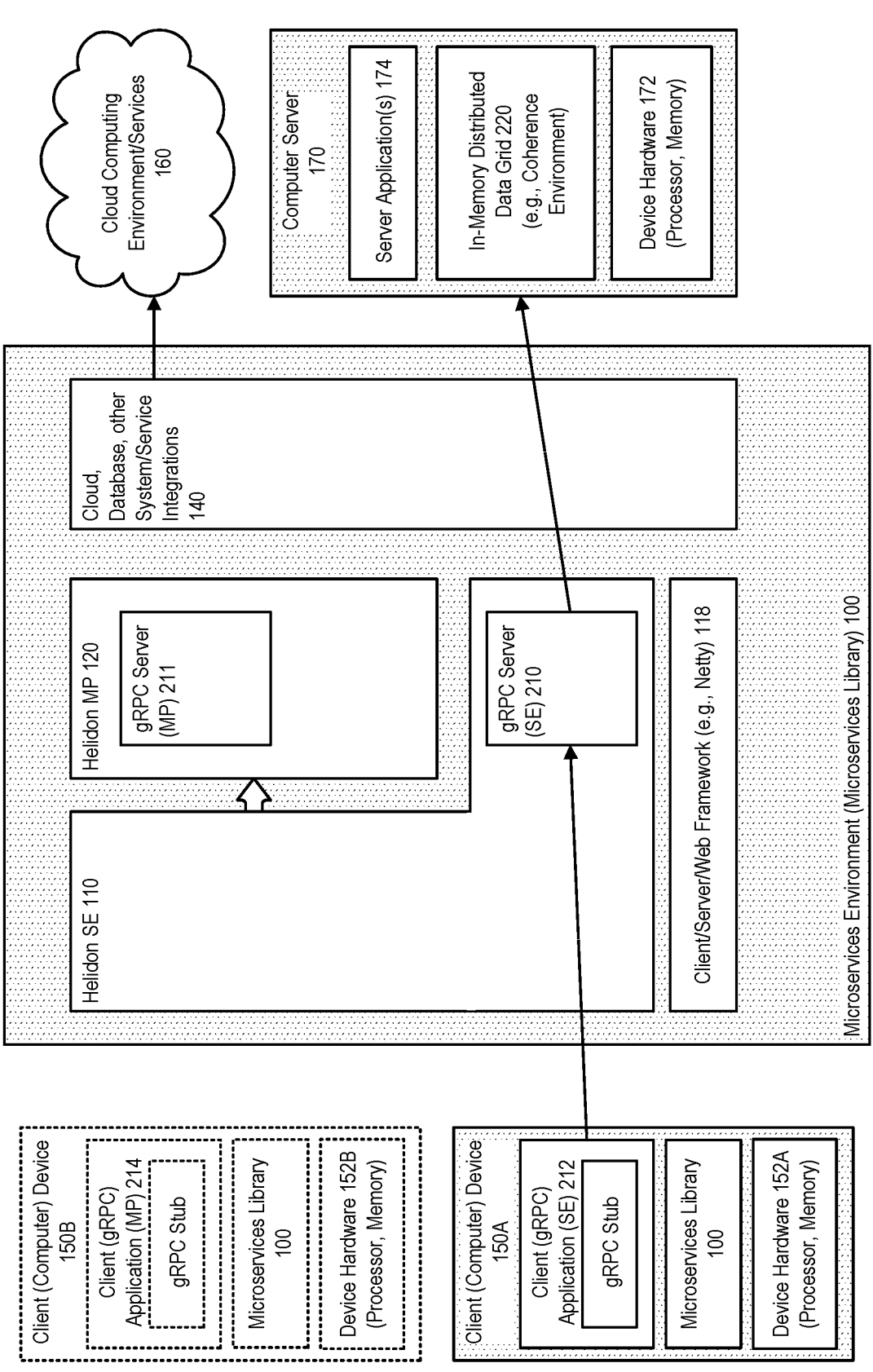
FIG. 8 further illustrates the use of gRPC in a microservices environment, in accordance with an embodiment.
Figure 9:
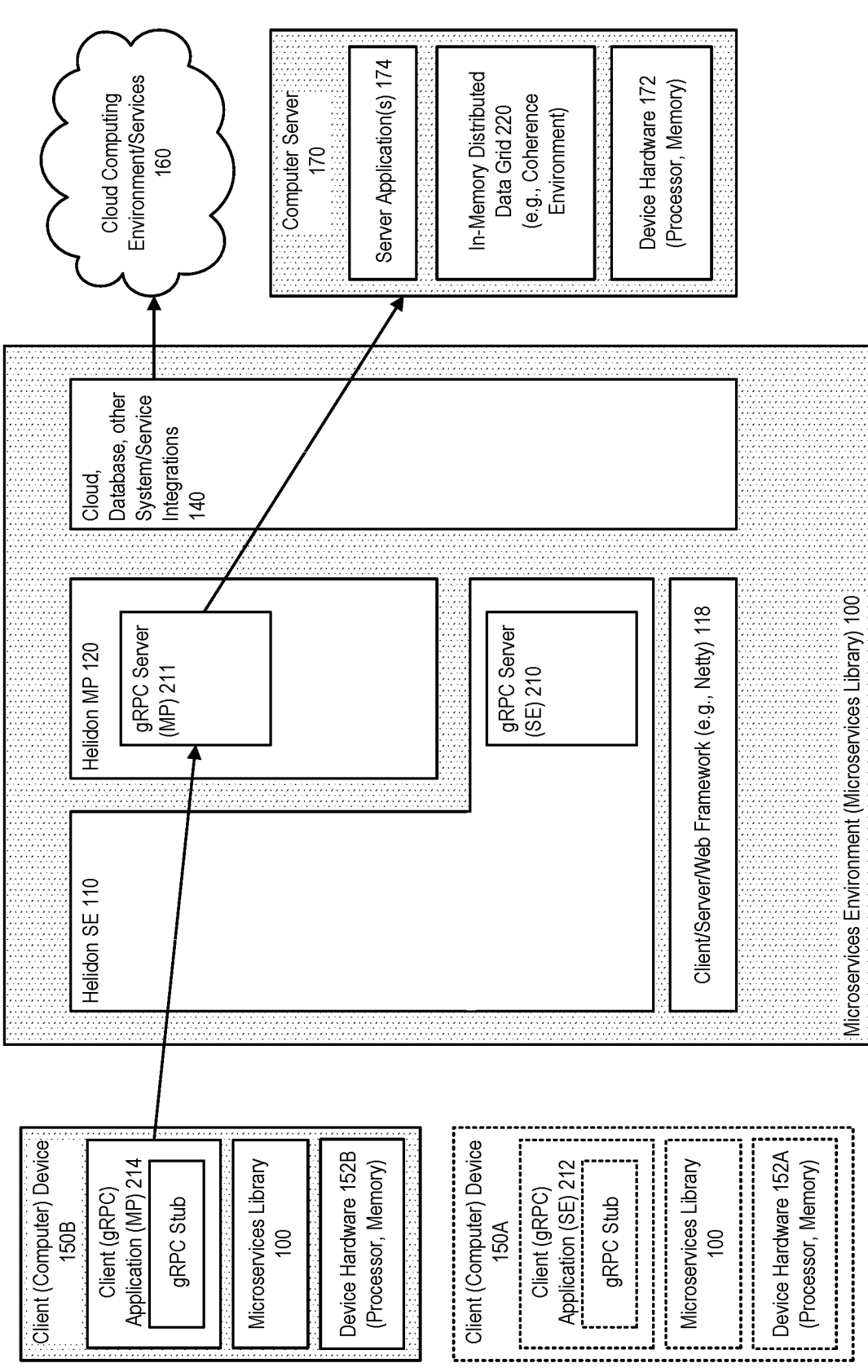
FIG. 9 further illustrates the use of gRPC in a microservices environment, in accordance with an embodiment.

FIGS. 8 and 9 further illustrate the use of gRPC in a microservices environment, in accordance with an embodiment.

As illustrated in FIGS. 8 and 9, in accordance with an embodiment, a microservices environment, for example a Helidon SE environment or a Helidon MP environment respectively, can include a remote procedure call framework or component, for example a gRPC server component 210, 211, which can be adapted for use in those (e.g., Helidon SE/MP) environments. Client applications can use a remote procedure call, for example a gRPC client component 212, 214, which can similarly be adapted for use in those (e.g., SE/MP environments).

In accordance with an embodiment, in a Helidon SE environment, the gRPC framework can be used to extend software classes, for example to provide an implementation of the server. For example, a gRPC service can be developed as a plain Java class, and the gRPC framework can then utilize those classes to provide gRPC services. Additional features provides by a Helidon SE environment, such as security, or metrics, can then be utilized in combination with the implemented service.

In accordance with an embodiment, in a Helidon MP environment, the gRPC framework can be used to write an annotated interface, wherein the gRPC server can determine from the annotations how to create the client application. This provides ease of development for the software developer in that they can use annotations to prepare client applications. The use of gRPC also alleviates the need for a software developer to use application profiles. The development of client applications can be derived from annotations on service implementation classes, and a proxy generated on the client side in response to the annotation.

In accordance with an embodiment, the use of remote procedure call components can enable communication between various different types of client and server applications, including, for example client and server applications associated with an in-memory data grid environment 220 such as, for example, an Oracle Coherence environment.

In accordance with various embodiments, a gRPC framework, including for example one based on Helidon SE or Helidon MP can be used to write services that leverage or take advantage of other systems, such as, for example in-memory data grids such as Coherence. For example, a Coherence API can be exposed as a gRPC service, which enables support for different types of clients with the Coherence environment, including support for the different types of clients to connect to a Coherence cluster via gRPC. Additional applications or pipelines can then be developed to access or otherwise use the Coherence environment, without the need for Coherence-specific/native client programming. The developer can focus on implementing their client applications, while requiring less attention on the particulars of the underlying infrastructure.

In accordance with an embodiment, the use of a remote procedure call component improves the ease of development of (e.g., gRPC) services both on the client side and the server side; while also leveraging the features of the microservices environment, such as, for example, security, configuration, metrics, and tracing. For example, the software developer can use the microservices environment in combination with the remote procedure call component to write plain Java classes, and then turn those into services.

In accordance with an embodiment, when used in, for example, a Coherence environment, a Coherence cluster or API can be provided as a gRPC service. This provides advantages over environments such as Coherence Extend or Coherence REST, in enabling improved support for other types of Coherence clients beyond native Java clients or applications, such as, for example, .Net, Ruby, or Swift applications. The software developer's attention can be directed more to the implementation of their client and server applications, and less toward the intermediary communication between those components.

Helidon SE gRPC Server

In accordance with an embodiment, in a Helidon SE environment, the gRPC framework can be used to extend software classes, for example to provide an implementation of the server. For example, a gRPC service can be developed as a plain Java class, and the gRPC framework can then utilize those classes to provide gRPC services. Additional features provides by a Helidon SE environment, such as security, or metrics, can then be utilized in combination with the implemented service.

In accordance with an embodiment, and by way of illustrative example, a gRPC software application that runs on a default port (1408) can be developed, for example, as:

```
    public static void main(String[ ] args) throws Exception {
        GrpcServer grpcServer = GrpcServer
                .create(GrpcRouting.builder( )
                    .register(new HelloService( ))
                    .build( ))
                .start( )
                .toCompletableFuture( )
                .get(10, TimeUnit.SECONDS);
                // Implement the simplest possible gRPC service.
        System.out.println("gRPC server started at: http://localhost:" +
grpcServer.port( ));
        }
        static class HelloService implements GrpcService {
        @Override
        public void update(ServiceDescriptor.Rules rules) {
            rules.unary("SayHello", ((request, responseObserver) ->
complete(responseObserver, "Hello " + request)));
            }
        }
    }
```

In the example illustrated above, the software application is adapted to register a gRPC service; start the gRPC server; wait for the server to start (while possibly throwing errors as exceptions); bind the server to a default port (1408); implement the gRPC service; and add a unary method HelloService/SayHello to the service definition.

In accordance with an embodiment, the above-described example deploys a service to the gRPC server that by default uses Java serialization to marshal requests and responses. In accordance with other embodiments, the system can support the deployment of "standard" gRPC services that use protobuf for request and response marshalling, as well as support for custom marshallers.

Maven Coordinates

In accordance with an embodiment, Maven coordinates can be used to declare dependency management for applications. For example, a dependency on the gRPC server can be defined in a software project as:

```
    <dependency>
        <groupId>io.helidon.grpc</groupId>
        <artifactId>helidon-grpc-server</artifactId>
    </dependency>
```

Helidon SE gRPC Server Configuration

In accordance with an embodiment, the gRPC server can be configured in a variety of ways, such as for example in the software application code itself, or in a configuration file. For example, in accordance with an embodiment, the gRPC server can be configured in the software application code as:

```
GrpcServerConfiguration configuration =
GrpcServerConfiguration.builder( )
    .port(8080)
    .build( );
GrpcServer grpcServer = GrpcServer.create(configuration, routing);
```

Alternatively, the gRPC server can be configured in a GrpcServer configuration file, for example in an application.yaml file as:

grpcserver:
    port: 3333

When configured in the software application code, the configuration can be loaded from the file, for example by providing the GrpcServer initialization using an application.conf file located on the classpath:

```
GrpcServerConfiguration configuration = GrpcServerConfiguration.create(
    Config.builder( )
        .sources(classpath("application.conf"))
        .build( ));
GrpcServer grpcServer = GrpcServer.create(configuration, routing);
```

Helidon SE gRPC Server Routing

In accordance with an embodiment, the gRPC server routes requests based on the service and method name. This simplifies routing configuration since that all that is needed is to register the service, for example as:

```
    private static GrpcRouting createRouting(Config config) {
        return GrpcRouting.builder( )
            .register(new GreetService(config))
            .register(new EchoService( ))
            .register(new MathService( ))
            .build( );
    }
```

In accordance with the example illustrated above, the gRPC server is configured to register a GreetService instance; register an EchoService instance; and register a MathService instance. Both "standard" gRPC services that implement an io.grpc.BindableService interface, and Helidon gRPC services that implement io.helidon.grpc.server-.GrpcService interface can be registered; the difference being that Helidon gRPC services allow customization of behavior down to the method level, and provide helper methods that make service implementation easier. Customizing Service Definitions In accordance with an embodiment, when registering a service, the software developer can customize its descriptor by providing a configuration consumer as an argument to the register method. This is useful when registering standard BindableService instances, since it allows addition of Helidon-specific behaviors, such as health checks and metrics, for example as:

```
private static GrpcRouting createRouting(Config config) {
    return GrpcRouting.builder( )
        .register(new GreetService(config))
        .register(new EchoService( ), service -> {
            service.healthcheck(CustomHealthChecks::echoHealthCheck)
                .metered( );
        })
        .build( );
}
```

In accordance with the example illustrated above, the service definition adds a custom health check to the service; and specifies that all the calls to service methods should be metered.
Specifying Global Interceptors In accordance with an embodiment, GrpcRouting allows the developer to specify custom interceptors that will be applied to all registered services. This can be used to configure features such as tracing, security and metrics collection, since Helidon provides built-in interceptors for these purposes that can then be registered with the routing definition, for example as:

```
private static GrpcRouting createRouting(Config config) {
    return GrpcRouting.builder( )
        .intercept(GrpcMetrics.timed( ))
        .register(new GreetService(config))
        .register(new EchoService( ))
        .register(new MathService( ))
        .build( );
}
```

In accordance with the example illustrated above, the system registers a GrpcMetrics interceptor that will collect timers for all methods of all services, but can be overridden at the individual service or method level.
Helidon SE gRPC Service Implementation In accordance with an embodiment, although the gRPC server enables deployment of a standard gRPC service that implements io.grpc.BindableService interface, using the Helidon gRPC framework to implement services provides additional benefits, such as, for example: allows definition of both HTTP and gRPC services using a similar programming model; simplifies the learning curve for developers; provides helper methods that make service implementation simpler; allows the developer to configure Helidon value-added features, such as security and metrics collection down to the method level; allows easy specification of custom marshallers for requests and responses if protobuf does not satisfy needs; and provides built-in support for health checks.

In accordance with an embodiment, in order to implement a Helidon gRPC service, the developer can create a class that implements io.helidon.grpc.server.GrpcService interface, and define one or more methods for the service, for example as:

```
class EchoService implements GrpcService {
    @Override
    public void update(ServiceDescriptor.Rules rules) {
        rules.unary("Echo", this::echo);
    }
    /**
     * Echo the message back to the caller.
     *
     * @param request the echo request containing the message to echo
     * @param observer the response observer
```

-continued

```
     */
    public void echo(String request, StreamObserver<String> observer) {
        complete(observer, request);
    }
}
```

In accordance with the example illustrated above, the class is adapted to define a unary method Echo and map it to the this::echo handler; and create a handler for the Echo method; and send the request string back to the client by completing response observer. The complete method illustrated In accordance with the example illustrated above is one of the helper methods available in the GrpcService class. The example illustrated above implements a service with a single unary method, which will be exposed at the 'EchoService/Echo' endpoint. Since the service does not explicitly define a marshaller for requests and responses, Java serialization will be used as a default.
Implementing Protobuf Services In accordance with an embodiment, although the developer can elect to implement clients manually, and configure them to use the same marshaller as the server, an alternative is to generate clients for various languages, using protobuf for marshalling, and implementing a protobuf-enabled Helidon gRPC service, as further described below.
Define the Service IDL In accordance with the example illustrated below, the EchoService described above can instead be implemented as a protobuf service in an echo.proto file, for example as:

```
syntax = "proto3";
option java_package = "org.example.services.echo";
service EchoService {
    rpc Echo (EchoRequest) returns (EchoResponse) { }
}
message EchoRequest {
    string message = 1;
}
message EchoResponse {
```

-continued

```
        string message = 1;
    }
```

In accordance with the example illustrated above, the gRPC compiler will generate message classes (EchoRequest and EchoResponse), client stubs that can be used to make RPC calls to the server, and a base class for the server-side service implementation. Implementing the Service In accordance with the example illustrated below, the service can be implemented using the Helidon gRPC framework instead, wherein the service implementation will be similar to the original implementation, for example as:

```
class EchoService implements GrpcService {
    @Override
    public void update(ServiceDescriptor.Rules rules) {
        rules.proto(Echo.getDescriptor( ))
            .unary("Echo", this::echo);
    }
    /**
     * Echo the message back to the caller.
     *
     * @param request the echo request containing the message to echo
     * @param observer the response observer
     */
    public void echo(Echo.EchoRequest request, StreamObserver<Echo.EchoResponse>
observer) {
        String message = request.getMessage( );
        Echo.EchoResponse response =
Echo.EchoResponse.newBuilder( ).setMessage(message).build( );
        complete(observer, response);
    }
}
```

In accordance with the example illustrated above, the class is adapted to specify a proto descriptor in order to provide the necessary type information and enable protobuf marshalling; define a unary method Echo and map it to the this::echo handler; create a handler for the Echo method, using protobuf message types for request and response; extract a message string from the request; create the response containing extracted message; and send the response back to the client by completing a response observer.

Helidon SE gRPC Interceptors

In accordance with an embodiment, the system allows the developer to configure standard 'io.grpc.ServerInterceptor's, for example by implementing an interceptor that logs each RPC call, for example as:

```
class LoggingInterceptor implements ServerInterceptor {
    private static final Logger LOG =
Logger.getLogger(LoggingInterceptor.class.getName( ));
    @Override
    public <ReqT, ResT> ServerCall.Listener<ReqT> interceptCall(ServerCall<ReqT, ResT>
call, Metadata metadata,
ServerCallHandler<ReqT, ResT> handler) {
        LOG.info(( ) -> "CALL: " + call.getMethodDescriptor( ));
        return handler.startCall(call, metadata);
    }
}
```

In accordance with the example illustrated above, the class is adapted to: implement io.grpc.ServerInterceptor; implement the logging logic; and start an intercepted call. Registering Interceptors In accordance with an embodiment, a developer can register interceptors globally, in which case they will be applied to all methods of all services, by adding them to the GrpcRouting instance, for example as:

```
private static GrpcRouting createRouting(Config config) {
    return GrpcRouting.builder( )
        .intercept(new LoggingInterceptor( ))
```

-continued

```
        .register(new GreetService(config))
        .register(new EchoService( ))
        .build( );
}
```

In accordance with the example illustrated above, the class is adapted to add LoggingInterceptor to all methods of GreetService and EchoService. The developer can register an interceptor for a specific service, either by implementing GrpcService.update method, for example by adding LoggingInterceptor to all methods Of MyService as:

```
public class MyService implements GrpcService {
    @Override
    public void update(ServiceDescriptor.Rules rules) {
        rules.intercept(new LoggingInterceptor( ))
            .unary("MyMethod", this::myMethod);
    }
    private <ReqT, ResT> void myMethod(ReqT request, StreamObserver<ResT> observer) {
        // do something
    }
}
```

Alternatively the developer can configure ServiceDescriptor externally, when creating GrpcRouting, which allows the developer to add interceptors to plain io.grpc.BindableService services, for example as:

```
private static GrpcRouting createRouting(Config config) {
    return GrpcRouting.builder( )
        .register(new       GreetService(config),      cfg      ->      cfg.intercept(new
LoggingInterceptor( )))
        .register(new EchoService( ))
        .build( );
}
```

In accordance with the example illustrated above, the class adds LoggingInterceptor to all methods Of GreetService (only).

In accordance with an embodiment, the developer can also register an interceptor at the method level, for example as:

```
public class MyService implements GrpcService {
    @Override
    public void update(ServiceDescriptor.Rules rules) {
        rules.unary("MyMethod",
            this::myMethod,
            cfg -> cfg.intercept(new LoggingInterceptor( )));
    }
    private <ReqT, ResT> void myMethod(ReqT request, StreamObserver<ResT> observer) {
        // do something
    }
}
```

In accordance with the example illustrated above, the class is adapted to add LoggingInterceptor to MyService:: MyMethod (only).

Helidon SE gRPC Service Health Checks

In accordance with an embodiment, Helidon gRPC services provide built-in support for Helidon health checks. Unless a custom health check is implemented by the service developer, each service deployed to the gRPC server will be provisioned with a default health check, which always returns status of UP. This allows all services, including those that do not have a meaningful health check, to show up in the health report (or to be queried for health) without the (service) developer having to provide anything further. Services that need custom health checks can define one directly within GrpcService implementation, for example as:

```
public class MyService implements GrpcService {
    @Override
    public void update(ServiceDescriptor.Rules rules) {
        rules.unary("MyMethod", this::myMethod)
            .healthcheck(this::healthcheck);
    }
    private HealthCheckResponse healthcheck( ) {
        boolean fUp = isMyServiceUp( );
        return HealthCheckResponse
            .named(name( ))
            .state(fUp)
            .withData("ts", System.currentTimeMillis( ))
            .build( );
    }
    private <ReqT, ResT> void myMethod(ReqT request, StreamObserver<ResT> observer) {
        // do something
    }
}
```

In accordance with the example illustrated above, the class is adapted to configure a custom health check for the service; determine a service status; use a service name as a health check name for consistency; use a determined service status; and optionally, provide additional metadata.

In accordance with an embodiment, the developer can also define a custom health check for an existing service, including plain io.grpc.BindableService implementations, using a service configurer inside the GrpcRouting definition, for example as:

```
private static GrpcRouting createRouting( ) {
    return GrpcRouting.builder( )
        .register(new     EchoService( ),     cfg     –>
```

```
-continued cfg.healthcheck(MyCustomHealthChecks::echoHealthCheck))
        .build( );
}
```

In accordance with the example illustrated above, the class is adapted to configure a custom health check for an existing or legacy service.

Exposing Health Checks

In accordance with an embodiment, gRPC service health checks are managed by the Helidon gRPC server, and are automatically exposed to the gRPC clients using a custom implementation of the standard gRPC HealthService API. They can also be exposed to REST clients via a standard Helidon/Microprofile/health endpoint, for example as:

```
GrpcServer     grpcServer     =     GrpcServer.create(grpcServerConfig( ),
createRouting(config));
    grpcServer.start( );
    HealthSupport health = HealthSupport.builder( )
        .add(grpcServer.healthchecks( ))
        .build( );
    Routing routing = Routing.builder( )
        .register(health)
        .build( );
    WebServer.create(webServerConfig( ), routing).start( );
```

In accordance with the example illustrated above, the class is adapted to: create a GrpcServer instance; start a gRPC server, which will deploy all services and register default and custom health checks; add gRPC server managed health checks to HealthSupport instance; add HealthSupport to the web server routing definition; and create and start web server. In accordance with the example illustrated above, all gRPC health checks will then be available via/health REST endpoint, in addition to the standard gRPC HealthService.

Helidon SE gRPC Service Metrics

In accordance with an embodiment, by default, gRPC server only captures two vendor-level metrics: grpc.request.count and grpc.request.meter. These metrics provide an aggregate view of requests across all services, and serve as an indication of the overall server load. Additionally, developers can enable a more fine-grained metrics by configuring a built-in GrpcMetrics interceptor within the routing, for example as:

```
private static GrpcRouting createRouting(Config config) {
    return GrpcRouting.builder( )
        .intercept(GrpcMetrics.timed( ))
        .register(new GreetService(config))
        .register(new EchoService( ))
        .build( );
    }
```

In accordance with the example illustrated above, the system is configured to capture metrics for all methods of all services as a timer. The example illustrated above creates and keeps a timer metric type for each method of each service. Alternatively, a counter, meter or a histogram could be used instead.

Overriding Metrics Capture

In accordance with an embodiment, while global metrics capture is useful, it is not always sufficient; and keeping a separate timer for each gRPC method may be overly burdensome. A developer could decide to use a lighter-weight metric type, such as counter or a meter; or may enable histogram or a timer for some services, or even only some methods of some services. This can be accomplished by overriding the type of the captured metric at either service or the method level, for example as:

```
private static GrpcRouting createRouting(Config config) {
    return GrpcRouting.builder( )
            .intercept(GrpcMetrics.counted( ))
            .register(new MyService( ))
            .build( );
    }
    public static class MyService implements GrpcService {
        @Override
        public void update(ServiceDescriptor.Rules rules) {
            rules
                .intercept(GrpcMetrics.metered( ))
                .unary("MyMethod", this::myMethod,
                    cfg -> cfg.intercept(GrpcMetrics.timer( )))
        }
        private <ReqT, ResT> void myMethod(ReqT request, StreamObserver<ResT>
observer) {
            // do something
        }
    }
```

In accordance with the example illustrated above, the class is adapted to use counter for all methods of all services, unless overridden; use meter for all methods of MyService; and use a timer for MyService::MyMethod.

Exposing Metrics Externally

In accordance with an embodiment, collected metrics are stored in Helidon metric registries, such as a vendor and application registry, and can be exposed via a standard/metrics REST API, for example as.

```
Routing routing = Routing.builder( )
    .register(MetricsSupport.create( ))
    .build( );
WebServer.create(webServerConfig( ), routing)
    .start( )
```

In accordance with the example illustrated above, the class is adapted to add Metrics Support instance to web server routing; and create and start a Helidon web server.

Specifying Metric Meta-data

In accordance with an embodiment, Helidon metrics contain meta-data such as tags, a description, and units, which can be added when specifying the metrics. To add tags to a metric a Map of key/value tags can be supplied, the tags( ) method can be used to add the Map of tags to the metric, for example as:

```
Map<String, String> tagMap = new HashMap<>( );
tagMap.put("keyOne", "valueOne");
tagMap.put("keyTwo", "valueTwo");
GrpcRouting routing = GrpcRouting.builder( )
    .intercept(GrpcMetrics.counted( ).tags(tagMap))
    .register(new MyService( ))
    .build( );
```

In accordance with an embodiment, a meaningful description can be added to a metric, for example the description( ) method can be used to add the description to the metric as:

```
GrpcRouting routing = GrpcRouting.builder( )
    .intercept(GrpcMetrics.counted( ).description("Something useful"))
```

-continued

```
.register(new MyService( ))
.build( );
```

In accordance with an embodiment, a units value can be added to the metric. For example the units( ) method can be used to add the metric units to the metric. Typically the units value is one of the constants from org.eclipse.microprofile-.metrics.MetricUnits class, for example:

```
GrpcRouting routing = GrpcRouting.builder( )
        .intercept(GrpcMetrics.timed( ).units(MetricUnits.SECONDS))
```

-

-continued

```
.register(new MyService( ))
.build( );
```

Overriding the Metric Name

In accordance with an embodiment, by default the metric name is the gRPC service name followed by a dot ('.') followed by the method name. It is possible to supply a function that can be used to override the default behaviour. The function should implement the io.helidon.grpc.metrics-.GrpcMetrics.NamingFunction interface, for example as:

```
@FunctionalInterface
public interface NamingFunction {
    /**
     * Create a metric name.
     *
     * @param service the service descriptor
     * @param methodName the method name
     * @param metricType the metric type
     * @return the metric name
     */
    String createName(ServiceDescriptor service, String methodName, MetricType
metricType);
}
```

In accordance with an embodiment, since this is a functional interface, a lambda can be used, for example as:

```
GrpcRouting routing = GrpcRouting.builder( )
        .intercept(GrpcMetrics.counted( )
            .nameFunction((svc, method, metric) -> "grpc." + service.name( ) + '.' +
method)
```

In accordance with the example illustrated above, the NamingFunction lambda returns the concatenated service name and method name with the prefix grpc. For a service "Foo", method "bar" the above example would produce a name "grpc.Foo.bar".

Helidon SE gRPC Server Security

In accordance with an embodiment, server security can be applied by declaring a dependency in the software application project, for example as:

```
<dependency>
    <groupId>io.helidon.security.integration</groupId>
    <artifactId>helidon-security-integration-grpc</artifactId>
</dependency>
```

In accordance with an embodiment, the steps to configure security with gRPC server include: creating security instance and register it with server; and protecting gRPC services of server with various security features. For example, the process can be performed using builders as:

```
// gRPC server's routing
GrpcRouting.builder( )
        // This is step 1 - register security instance with gRPC server processing
        // security - instance of security either from config or from a builder
        // securityDefaults - default enforcement for each service that has a security
definition
        .intercept(GrpcSecurity.create(security).securityDefaults(GrpcSecurity.authenticate( ))
)
        // this is step 2 - protect a service
        // register and protect this service with authentication (from defaults) and role
```

```
"user"
    .register(greetService, GrpcSecurity.rolesAllowed("user"))
    .build( );
```

In accordance with an embodiment, builders can also be used for a more fine-grained method level security, for example as:

```
// create the service descriptor
ServiceDescriptor greetService = ServiceDescriptor.builder(new GreetService( ))
        // Add an instance of gRPC security that will apply to all methods of
        // the service - in this case require the "user" role
        .intercept(GrpcSecurity.rolesAllowed("user"))
        // Add an instance of gRPC security that will apply to the "SetGreeting"
        // method of the service - in this case require the "admin" role
        .intercept("SetGreeting", GrpcSecurity.rolesAllowed("admin"))
        .build( );
// Create the gRPC server's routing
GrpcRouting.builder( )
    // This is step 1 - register security instance with gRPC server processing
    // security - instance of security either from config or from a builder
    // securityDefaults - default enforcement for each service that has a security
definition
.intercept(GrpcSecurity.create(security).securityDefaults(GrpcSecurity.authenticate( ))
)
    // this is step 2 - add the service descriptor
    .register(greetService)
    .build( );
```

In accordance with an embodiment, a security configuration can be illustrated as, for example:

```
GrpcRouting.builder( )
    // helper method to load both security and gRPC server security from configuration
    .intercept(GrpcSecurity.create(config))
    // continue with gRPC server route configuration...
    .register(new GreetService( ))
    .build( );
```

In accordance with an embodiment, another example of providing a security configuration can be illustrated as:

```
security
    grpc-server:
        # Configuration of integration with gRPC server
        defaults:
                authenticate: true
        # Configuration security for individual services
        services:
        - name: "GreetService"
            defaults:
            roles-allowed: ["user"]
            # Configuration security for individual methods of the service
            methods:
            - name: "SetGreeting"
                roles-allowed: ["admin"]
```

Client Security

In accordance with an embodiment, when using a Helidon SE gRPC client API, security can be configured for a gRPC service or at the individual method level. The client API    60 provides a custom CallCredentials implementation that integrates with the Helidon security APIs. For example, configuring client security for a service can be illustrated as:

```
Security security = Security.builder( )
        .addProvider(HttpBasicAuthProvider.create(config.get("http-basic-auth")))
        .build( );
```

```
GrpcClientSecurity        clientSecurity        =
GrpcClientSecurity.builder(security.createContext("test.client"))
      .property(HttpBasicAuthProvider.EP_PROPERTY_OUTBOUND_USER, user)
      .property(HttpBasicAuthProvider.EP_PROPERTY_OUTBOUND_PASSWORD, password)
      .build( );
ClientServiceDescriptor descriptor = ClientServiceDescriptor
      .builder(StringService.class)
      .unary("Lower")
      .callCredentials(clientSecurity)
      .build( );
GrpcServiceClient client = GrpcServiceClient.create(channel, descriptor);
String response = client.blockingUnary("Lower", "ABCD");
```

In accordance with the example illustrated above, the system creates the Helidon Security instance (in this case using the basic auth provider); creates the GrpcClientSecurity gRPC CallCredentials adding the user and password property expected by the basic auth provider; creates the gRPC ClientServiceDescriptor for the StringService gRPC service; sets the GrpcClientSecurity instance as the call credentials for all methods of the service; creates a GrpcServiceClient that will allow methods to be Called on the service; and calls the "Lower" method which will use the configured basic auth credentials.

In accordance with an embodiment, another example of configuring client security for a specific method can be illustrated as:

```
GrpcClientSecurity        clientSecurity        =
GrpcClientSecurity.builder(security.createContext("test.client"))
      .property(HttpBasicAuthProvider.EP_PROPERTY_OUTBOUND_USER, user)
      .property(HttpBasicAuthProvider.EP_PROPERTY_OUTBOUND_PASSWORD, password)
      .build( );
ClientServiceDescriptor descriptor = ClientServiceDescriptor
      .builder(StringService.class)
      .unary("Lower")
      .unary("Upper", rules -> rules.callCredentials(clientSecurity))
      .build( );
```

In accordance with the example illustrated above, the system creates the GrpcClientSecurity call credentials in the same way as above; and creates the ClientServiceDescriptor, this time with two unary methods, "Lower" and "Upper". The "Upper" method is configured to use the GrpcClientSecurity call credentials, the "Lower" method will be called without any credentials.

Outbound Security

In accordance with an embodiment, outbound security addresses three scenarios: calling a secure gRPC service from inside a gRPC service method handler; calling a secure gRPC service from inside a web server method handler; and calling a secure web endpoint from inside a gRPC service method handler. Within each of these scenarios, credentials can be propagated if the gRPC/http method handler is executing within a security context; alternatively credentials can be overridden to provide a different set of credentials to use to call the outbound endpoint. For example. calling a secure gRPC service from inside a gRPC service method handler can be illustrated as:

```
// Obtain the SecurityContext from the current gRPC call Context
SecurityContext securityContext = GrpcSecurity.SECURITY_CONTEXT.get( );
// Create a gRPC CallCredentials that will use the current request's
// security context to configure outbound credentials
GrpcClientSecurity clientSecurity = GrpcClientSecurity.create(securityContext);
// Create the gRPC stub using the CallCredentials
EchoServiceGrpc.EchoServiceBlockingStub        stub        =
noCredsEchoStub.withCallCredentials(clientSecurity);
```

In accordance with an embodiment, an example of calling a secure gRPC service from inside a web server method handler can be illustrated as:

```
private static void propagateCredentialsWebRequest(ServerRequest req, ServerResponse
res) {
    try {
        // Create a gRPC CallCredentials that will use the current request's
        // security context to configure outbound credentials
        GrpcClientSecurity clientSecurity = GrpcClientSecurity.create(req);
        // Create the gRPC stub using the CallCredentials
        EchoServiceGrpc.EchoServiceBlockingStub stub =
noCredsEchoStub.withCallCredentials(clientSecurity);
        String message = req.queryParams( ).first("message").orElse(null);
        Echo.EchoResponse echoResponse =
stub.echo(Echo.EchoRequest.newBuilder( ).setMessage(message).build( ));
        res.send(echoResponse.getMessage( ));
    } catch (StatusRuntimeException e) {
        res.status(GrpcHelper.toHttpResponseStatus(e)).send( );
    ) catch (Throwable thrown) {
        res.status(Http.ResponseStatus.create(500, thrown.getMessage( ))).send( );
    }
}
```

In accordance with an embodiment, an example of calling a secure web endpoint from inside a gRPC service method handler can be illustrated as:

```
// Obtain the SecurityContext from the gRPC call Context
SecurityContext securityContext = GrpcSecurity.SECURITY_CONTEXT.get( );
// Use the SecurityContext as normal to make a http request
Response webResponse = client.target(url)
    .path("/test")
    .request( )
    .property(Clientsecurity.PROPERTY_CONTEXT, securityContext)
    .get( );
```

Helidon SE gRPC Client Introduction

In accordance with an embodiment, the Helidon gRPC Client provides a framework for creating gRPC client applications. The client framework allows a uniform way to access gRPC services that use either protobuf or some custom serialization format. It also allows access to gRPC services that use either Java serialization, protobuf or a custom serialization format.

In accordance with an embodiment, the class GrpcServiceClient acts as the client object for accessing a gRPC service. Creating a GrpcServiceClient involves creating a ClientServiceDescriptor which describes the methods in the service that this client can invoke; and creating a gRPC Channel through which the client communicates with the server.

Maven Coordinates

In accordance with an embodiment, Maven coordinates can be used to declare dependency management for Helidon applications in a project, for example to declare a Helidon gRPC Client as:

```
<dependency>
    <groupId>io.helidon.grpc</groupId>
    <artifactId>helidon-grpc-client</artifactId>
</dependency>
```

Quick Start

In accordance with an embodiment, the developer can create and run a minimalist HelloService gRPC server application, assuming that the server is running on port 1408, create a client for example as:

```
public static void main(String[ ] args) throws Exception {
    ClientServiceDescriptor descriptor =
ClientServiceDescriptor.builder(HelloService.class)          // (1)
                                                           .unary("SayHello")
    // (2)
                                                           .build( );
    Channel channel = ManagedChannelBuilder.forAddress("localhost", 1408)
    // (3)
            .usePlaintext( )
            .build( );
    GrpcServiceClient client = GrpcServiceClient.create(channel, descriptor);
    // (4)
    CompletionStage<String> future = client.unary("SayHello", "Helidon gRPC!!");
```

-continued

```
// (5)
    System.out.println(future.get( ));
// (6)
}
```

In accordance with the example illustrated above, the process includes creating a ClientServiceDescriptor for the HelloService; and adding the SayHello unary method to the ClientServiceDescriptor. This method, by default, uses Java serialization for marshalling and unmarshalling the request and response values; creates a gRPC Channel that is communicates with the server that is running in localhost and on port 1408 (using plaintext); and creates the GrpcServiceClient that uses the above Channel and ClientServiceDescriptor. GrpcClientService represents a client that can be used to define the set of methods described by the specified ClientServiceDescriptor. In this example, the ClientServiceDescriptor defines a unary method called SayHello; invokes the SayHello method which returns a CompletionStage<String>; and prints the result. The example above creates a client to the gRPC server that by default uses Java serialization to marshall requests and responses.

Helidon SE gRPC Client Configuration

In accordance with an embodiment, a gRPC client can be configured using the Helidon configuration framework, either programmatically or via a configuration file. As described above, creating a GrpcServiceClient involves creating a ClientServiceDescriptor which describes the methods in the service that this client can invoke; and creating a gRPC Channel through which the client communicates with the server.

Configuring the ClientServiceDescriptor in your code

In accordance with an embodiment, the ClientServiceDescriptor can be configured in the application code, for example as:

```
ClientServiceDescriptor descriptor = ClientServiceDescriptor +
    .builder(HelloService.class)        // (1)
    .unary("SayHello")                  // (2)
    .build( );                          // (3)
```

In accordance with the example illustrated above, the method includes creating a builder for a ClientServiceDescriptor for the HelloService; and specifying that the HelloService has a unary method named SayHello. There are other methods in the class that allow the developer to define ClientStreaming, ServerStreaming and Bidirectional methods; and build the ClientServiceDescriptor.

Configuring the gRPC Channel

In accordance with an embodiment, gRPC allows various channel configurations (deadlines, retries, interceptors etc.).

Helidon SE gRPC Client Implementation

In accordance with an embodiment, the gRPC client framework allows the developer to write gRPC clients to access any gRPC service implementation. The benefits of using Helidon gRPC Client Framework includes that it: provides a number of helper methods that make client implementation significantly simpler; allows the developer to configure some of the Helidon value-added features, such as security and metrics collection and interceptors down to the method level; and allows the developer to easily specify custom marshaller for requests and responses if protobuf does not satisfy their needs.

Client Implementation Basics

In accordance with an embodiment, a first step to create a Helidon gRPC client application is to describe the set of methods in the gRPC service. Helidon gRPC Client Framework (called the "Client framework" in the remainder of the document) provides a class called ClientServiceDescriptor to describe the set of methods of a service that the client may invoke. There are three ways to build and initialize a ClientServiceDescriptor. The first option is to initialize ClientServiceDescriptor using protoc generated artifacts like BindableService or io.grpc.ServiceDescriptor. This option is possible if the gRPC service was built using .proto file. In this case the set of gRPC methods, their types and the appropriate marshallers are detected automatically. This is certainly the easiest way to initialize a ClientServiceDescriptor. The second option is to programmatically build the ClientServiceDescriptor. This option should be taken if the service was not built from protobuf files or if the protoc generated artifacts are not available to the client. The third option is to load the method descriptions from a configuration file.

The next step is to create a gRPC Channel to use to communicate with the server.

Finally, the developer creates an instance of GrpcServiceClient passing the ClientMethodDescriptor and the Channel instances.

Creating gRPC Clients from protoc Generated Artifacts

In accordance with an embodiment as described above, the easiest way to create a ClientServiceDescriptor is to create it from an io.grpc.ServiceDescriptor or from a io.grpc.BindableService. It is fairly trivial to obtain these from a service generated from artifacts generated from protobuf IDL file. For example, assume the following proto file:

```
syntax = "proto3";
option java_package = "io.helidon.grpc.client.test";
service StringService {
    rpc Upper (StringMessage) returns (StringMessage) { }          // (Unary)
    rpc Lower (StringMessage) returns (StringMessage) { }          // (Unary)
    rpc Split (StringMessage) returns (stream StringMessage) { }   // (Server
Streaming)
    rpc Join (stream StringMessage) returns (StringMessage) { }    // (Client
Streaming)
    rpc Echo (stream StringMessage) returns (stream StringMessage) { }  //
(Bidirectional Streaming)
```

-continued

```
}
message StringMessage {
    string text = 1;
}
```

In accordance with an embodiment, if the developer runs it through protoc it will generate a class (among other things) called StringService. Assuming that the StringService server is running on port 1408, the developer can create a Helidon gRPC Client that uses the Client Framework to invoke various types of gRPC methods.

Creating and Initializing a ClientServiceDescriptor for StringService

In accordance with an embodiment, the developer can build a class called ProtoBasedStringServiceClient that invokes the various types of gRPC methods that StringService offers, for example as:

```
public class ProtoBasedStringServiceClient {
    private GrpcServiceClient client;
    public ProtoBasedStringServiceClient( ) {
        ClientServiceDescriptor desc = ClientServiceDescriptor
                .builder(StringService.getServiceDescriptor( ))              // (1)
                .build( );
        Channel channel = ManagedChannelBuilder.forAddress("localhost", 1408) // (2)
                .usePlaintext( ).build( );
        this.client = GrpcServiceClient.create(channel, desc);               // (3)
    }
    /**
        * Many gRPC methods take a {@link io.grpc.Streamobserver} as an argument. Lets
        * build a helper class that can be used in our example.
        */
    public static class StringMessageStream<T>                               // (4)
            implements StreamObserver<T> {
            @Override
            public void onNext(T value) {
                System.out.println("Received : " + value);
            }
            @Override
            public void onError(Throwable t) {
                t.printStracktrace( );
            }
            @Override
            public void onCompleted( ) {
                System.out.printin("DONE");
            }
    }
}
```

In accordance with an embodiment, the process incudes initializing the builder by specifying the StringService's proto 'ServiceDescriptor. From the ServiceDescriptor the builder detects the service name, the set of method names, and for each method its type (e.g., Unary, ServerStreaming), the request and response types (and hence their corresponding Marshallers). A Channel can be created to the service that is running on localhost:1408. Finally, we create our GrpcServiceClient by using the above-described ClientServiceDescriptor and Channel. This client reference will be used to invoke various gRPC methods in StringService A static inner class can be defined that implements the io.grpc.StreamObserver interface. An instance of this class can be used wherever a io.grpc.StreamObserver is required (like server streaming, bi-directional streaming methods).

Invoking a Unary Method on the StringService

In accordance with an embodiment, the Client Framework provides helper methods to invoke gRPC unary methods, for example as:

```
public class ProtoBasedStringServiceClient {
    private GrpcServiceClient client;
    public ProtoBasedStringServiceClient( ) { /* code omitted */ }
    public void invokeUnaryMethod( ) throws Exception {
        StringMessage input = StringMessage.newBuilder( ).setText("ABC").build( );
        CompletableFuture<String> result = client.unary("Lower", input);      // (1)
        String lcase = client.blockingUnary("Lower", input);                  // (2)
        StringMessageStream stream = new StringMessageStream<StringMessage>( );
        client.blockingUnary("Lower", input);                                 // (3)
```

-continued

```
    }
    public static class StringMessageStream<T> { /* code omitted */ }
}
```

In accordance with an embodiment, this variant of the unary API takes the method name and a request object and returns a CompletableFuture<Response> where <Response> is the response type. Here the Lower method is invoked, passing the input StringMessage. This method returns a CompletableFuture<StringMessage> as response thus allowing the client to obtain the result asynchronously.

This is a wrapper around the above method, and blocks until the result is available. Here we create invoke the unary method by passing the StringMessageStream whose onNext method will be called (once) when the result is available. Invoking a Client Streaming Method on the StringService In accordance with an embodiment, we can invoke the Join method which causes the server to return a single result after the client has streamed the request values to the server. gRPC API expects the client application to provide an instance of io.grpc.StreamObserver as an argument during the invocation of the client streaming method.

In order to simplify the task of invoking Client Streaming methods, the Helidon Client Framework provides a couple of methods to invoke gRPC Client Streaming methods. The first variant takes an Iterable as argument which in turn is converted into a io.grpc.StreamObserver. The second variant takes a io.grpc.StreamObserver as argument. The first variant can be used if the number of values to be streamed in small and known a priori, for example as:

```
public class ProtoBasedStringServiceClient {
    private GrpcServiceClient client;
    public ProtoBasedStringServiceClient( ) { /* code omitted */ }
    public void invokeClientStreamingWithIterable( ) throws Exception {
        String sentence = "A simple invocation of a client streaming method";
        Collection<StringMessage> input = Arrays.stream(sentence.split(" "))        //
(1)
                        .map(w -> StringMessage.newBuilder( ).setText(w).build( ))
                        .collect(Collectors.toList( ));
        CompletableFuture<StringMessage> result =
                        grpcClient.clientstreaming("Join", input);                  //
(2)
    }
    public void invokeClientStreaming( ) throws Exception {
        String sentence = "A simple invocation of a client streaming method";
        StringMessageStream responseStream = new StringMessageStream<StringMessage>( );
        StreamObserver<StringMessage> clientStream =
                        grpcClient.clientStreaming("Join", responseStream);         //
(3)
        for (String word : sentence.split(" ")) {
            clientstream.onNext(StringMessage.newBuilder( ).setText(word).build( ));    //
(4)
        }
        clientStream.onCompleted( );                                              //
(5)
    }
    public static class StringMessageStream<T> { /* code imitted */ }
}
```

In accordance with an embodiment, the developer can prepare the collection that contains the values to be streamed. We call the first variant of the clientStreaming( ) method that takes the method name and the collection of values to be streamed from the client. The above helper method is useful if the values to be streamed is fixed and small in number. If the number of values to be streamed is large (or unknown), then it is better to use this variant of the clientStreaming( ) method that takes a io.grpc.StreamOb- server as an argument. This method returns a client stream through which the client can stream (potentially a large number of) value to the server. Once the client stream is obtained, the client streams the values using the onNext( ) method on the stream. When all values have been stream, the client invokes the onCompleted( ) method signal that all values have been streamed from the client.
Invoking a Server Streaming Method on the StringService In accordance with an embodiment, a "Split" method causes the server to stream the results back, for example as:

```
public class ProtoBasedStringServiceClient {
    private GrpcServiceClient client;
```

-continued

```
    public ProtoBasedStringServiceClient( ) { /* code omitted */ }
    public void invokeServerStreaming( ) throws Exception {
        String sentence = "This sentence will be split into words and sent back to
client";
        StringMessage input = StringMessage.newBuilder( ).setText(sentence).build( );
// (1)
        StringMessageStream<StringMessage> observer = new StringMessageStream<>( );
// (2)
        grpcClient.serverStreaming("Split", input, observer);
// (3)
    }
    public static class StringMessageStream<T> { /* code imitted */ }
}
```

In accordance with an embodiment, the above can be used to prepare the input StringMessage that needs to be split. We create a StringMessageStream which will receive the results streamed from the server; and call the serverstreaming( ) passing the input and the StringMessageStream as arguments. The server sends a stream of words by calling the onNext( ) method on the StringMessageStream for each word.

Invoking a Bi-Directional Streaming Method on the String-Service

In accordance with an embodiment, the Echo method in which both the client and the server have to stream the request and response, can be used, for example as:

```
public class ProtoBasedStringServiceClient {
    private GrpcServiceClient client;
    public ProtoBasedStringServiceClient( ) { /* code omitted */ }
    public void invokeBidiStreaming( ) throws Exception {
        StringMessageStream<StringMessage> observer = new StringMessageStream<>( );
// (1)
        StringMessageStream<StringMessage> clientstream = grpcClient
                .bidiStreaming("Echo", observer);                        //
(2)
        String sentence = "Each word will be echoed back to the client by the server";
        for (String word : sentence.split(" ")) {
            clientStream.onNext(StringMessage.newBuilder( ).setText(word).build( ));
// (3)
        }
        clientstream.onCompleted( );                                     //
(4)
    }
    public static class StringMessageStream<T> { /* code imitted */ }
}
```

In accordance with an embodiment illustrated above, the process includes creating a StringMessageStream which will receive the results streamed from the server. We call the bidiStreaming( ) passing the observer as argument. The server will send its results through this stream (basically by calling the onNext( ) on the observer). The method returns a (client) stream which should be used by the client to stream values to the server. We stream each word in our sentence to the server by calling the onNext( ) method on the client-Stream. We call the onCompleted( ) method on the client-Stream to signal that the client has streamed all its values.

Programmatically Creating ClientServiceDescriptor for StringService

In accordance with an embodiment, assuming that the service is still running on port 1408, let's see how to create our Client without using the StringService's proto Service-Descriptor. Since we are not going to use the StringService's proto ServiceDescriptor, we need to describe the methods that the client need to invoke. The Helidon client framework provides APIs to easily describe gRPC methods. For example, to register a unary method, we need to use the unary method and configure it to specify the request and response types.

```
public class StringServiceClient {
    public static void main(String[ ] args) {
        ClientMethodDescriptor lower = ClientMethodDescriptor
                .unary("StringService", "Lower")                // (1)
                .requestType(StringMessage.class)               // (2)
                .responseType(StringMessage.class)              // (3)
                .build( );                                      // (4)
```

-continued

```
        ClientMethodDescriptor join = ClientMethodDescriptor
                .clientStreaming("StringService", "Join")                    // (5)
                .requestType(StringMessage.class)
                .responseType(StringMessage.class)
                .build( );
        ClientMethodDescriptor split = ClientMethodDescriptor
                .serverStreaming("StringService", "Split")                   // (6)
                .requestType(StringMessage.class)
                .responseType(StringMessage.class)
                .build( );
        ClientMethodDescriptor echo = ClientMethodDescriptor
                .bidirectional("StringService", "Echo")                      // (7)
                .requestType(StringMessage.class)
                .responseType(StringMessage.class)
                .build( );
        ClientServiceDescriptor serviceDesc = ClientServiceDescriptor        // (8)
                .builder(StringService.class)
                .unary(lower)
                .clientStreaming(join)
                .serverStreaming(split)
                .bidirectional(echo)
                .build( );
        Channel channel = ManagedChannelBuilder.forAddress("localhost", 1408)      //
(9)
                .usePlaintext( ).build( );
        GrpcServiceClient client = GrpcServiceClient.create(channel, serviceDesc);        //
(10)
        }
}
```

In accordance with the example illustrated above, the process includes using the unary( ) method on Client-MethodDescriptor to create a builder for a gRPC unary method. The service name and the method name ("Lower") are specified; setting the request type of the method to be stringMessage (since the Lower method takes stringMes-sage as a parameter); setting the response type of the method to be stringMessage (since the Lower method returns a StringMessage as a parameter); building the ClientMethod-Descriptor (the return value is a ClientMethodDescriptor that contains the correct Marshallers for the request & response types); using the clientStreaming( ) method on ClientMethodDescriptor to create a builder for a gRPC client streaming method. The service name and the method name ("Join") are specified; using the serverStreaming( ) method on ClientMethodDescriptor to create a builder for a gRPC server streaming method. The service name and the method name ("Split") are specified; using the bidirectional( ) method on ClientMethodDescriptor to create a builder for a gRPC Bidi streaming method. The service name and the method name ("Echo") are specified; and creating a Client-ServiceDescriptor for service named Stringservice and add all our ClientMethodDescriptor S. We create a Channel to the service that is running on localhost:1408. Finally, we create our GrpcServiceClient by using the above mentioned ClientServiceDescriptor and Channel. At this point the client object can be used to invoke any of the four types of methods described above.

Creating gRPC Clients for Non Protobuf Services

In accordance with an embodiment, if the service is not using protobuf for serialization, then the Client framework allows the developer to programmatically initialize Client-MethodDescriptor and create clients to invoke methods on the service.

For example, the developer can create the set of Client-MethodDescriptor s and the ClientServiceDescriptor as described in the previous section, but with one change—to not to set the request and response types in the Client-MethodDescriptor. An API in the ClientServiceDescriptor allows for passing the method name. For example, to create a client streaming method called "JoinString" that uses java serialization call the clientStreamin("JoinString"). For example, creating a client for a service that uses Java serialization can be illustrated as:

```
public static void main(String[ ] args) throws Exception {
        ClientServiceDescriptor descriptor =
ClientServiceDescriptor.builder(HelloService.class) // (1)
                .clientstreaming("JoinString") // (2)
                .build( );
        Channel channel = ManagedChannelBuilder.forAddress("localhost", 1408)
                .usePlaintext( )
                .build( );
        GrpcServiceClient client = GrpcServiceClient.create(channel, descriptor);
        String sentence = "A simple invocation of a client streaming method";
        Collection<StringMessage> input = Arrays.stream(sentence.split(" "))
                .map(w -> StringMessage.newBuilder( ).setText(w).build( ))
                .collect(Collectors.toList( ));
        CompletableFuture<StringMessage> result = grpcClient.clientstreaming("Join", input);
}
```

In accordance with an embodiment, the above creates a ClientServiceDescriptor for the HelloService; and adds the "JoinString" client streaming method to the ClientService-Descriptor. Since we didn't set the request or response type (like we did in the previous sections), Java serialization will be used for Marshalling and Unmarshalling the request and response values.

Helidon MP gRPC MicroProfile Server Services

In accordance with an embodiment, in a Helidon MP environment, the gRPC framework can be used to write an annotated interface, wherein the gRPC server can determine from the annotations how to create the client application. This provides ease of development for the software developer in that they can use annotations to prepare client applications. The use of gRPC also alleviates the need for a software developer to use application profiles. The development of client applications can be derived from annotations on service implementation classes, and a proxy generated on the client side in response to the annotation.

In accordance with an embodiment, the gRPC MicroProfile APIs are an extension to Helidon MP to allow building of gRPC services and clients that integrate with the Microprofile APIs. Using Helidon gRPC MP makes building gRPC services and clients an easier process that the traditional approach using protobuf files and code generation. Services can be built using POJOs that are then discovered and deployed at runtime in the same way the Helidon MP discovers and deploys web resources in the MP http server. Building gRPC services using Helidon gRPC allows the developer to concentrate on their application logic without needing to write a lot of boilerplate gRPC code.

Maven Coordinates

In accordance with an embodiment, Maven coordinates can be used to declare dependency management for Helidon applications, for example by declaring a dependency in the project:

```
<dependency>
    <groupId>io.helidon.microprofile.grpc</groupId>
    <artifactId>helidon-microprofile-grpc-server</artifactId>
</dependency>
```

Defining a Service

The traditional approach to building Java gRPC services is to write protobuf files describing the service and then use these to generate service stubs and finally implementing the service methods by extending the generated stub classes. In accordance with an embodiment, using Helidon gRPC MP the developer just need to write an annotated service implementation class that is just a normal POJO. For example, a simple gRPC Service can be prepared as:

```
@ApplicationScoped
@io.helidon.microprofile.grpc.core.Grpc
public class StringService {
    @io.helidon.microprofile.grpc.core.Unary
    public String upper(String s) {
        return s == null ? null : s.toUpperCase( );
    }
}
```

In accordance with the example illustrated above, the code above is a simple service with a single unary method that just converts a String to uppercase. The important parts in the example are the @ApplicationScoped, @Grpc and @Unary annotations; these, along with other annotations discussed later, allow the gRPC MP APIs to discover, configure and deploy the service.

Helidon gRPC MP does not preclude the developer from using the protobuf files approach, traditional gRPC Java services also work in a gRPC MP server. A Helidon gRPC MP service is just an annotated POJO, and to make a class a service requires two annotations.

```
@ApplicationScoped
@io.helidon.microprofile.grpc.core.Grpc
public class StringService {
```

In accordance with an embodiment, the above ApplicationScoped annotation is what makes the service implementation a CDI bean and hence discoverable. The Grpc annotation is what defines the class as a gRPC service so that when the bean is discovered it is then deployed by the gRPC MP server.

Service Name

By default when a class is annotated with Grpc the class name will be used as the gRPC service name. So In accordance with the example illustrated above the service name will be Stringservice. This can be changed by supplying a name to the annotation.

```
@ApplicationScoped
@io.helidon.microprofile.grpc.core.Grpc(name="Strings")
public class StringService {
```

In accordance with the example illustrated above the name of the deployed service will be Strings.

Defining Service Methods

In accordance with an embodiment, once a class is properly annotated to make it a gRPC MP service it needs to have service methods that implement the software application business logic. As described above, gRPC allows definition of various different types of service methods, such as, for example: unary RPC methods, wherein a client sends a single request to a server and receives a single response; server streaming RPC methods, wherein a client sends a request to a server and receives a stream of messages, and wherein gRPC guarantees message ordering within each RPC call; client streaming RPC methods, wherein a client writes a sequence of messages and sends those messages to a server; and then waits for the server to return a response, and wherein gRPC guarantees message ordering within each RPC call; or bidirectional streaming RPC methods, wherein both client and server send a sequence of messages using a read-write stream, and wherein the two streams operate independently, so that clients and servers can read and write in whichever order it is preferred. The Helidon gRPC MP API determines a method type by its annotation, which should be one of the following:

@io.helidon.microprofile.grpc.core.Unary
@io.helidon.microprofile.grpc.core.ServerStreaming
@io.helidon.microprofile.grpc.core.ClientStreaming
@io.helidon.microprofile.grpc.core.Bidirectional Request an Response Types In accordance with an embodiment, a gRPC service method typically takes a request parameter and returns a response value (streaming methods may take or return multiple requests or responses). In traditional gRPC Java the types used for the request and response values must be protobuf serializable classes but this is not the case with Helidon gRPC. Helidon supports pluggable marshallers and by default will support any Java primitive or Java Serializable as well as protobuf types. Any type that can be marshalled by the built-in marshallers or custom supplied marshaller may be used as a request or response type.

Unary Methods

In accordance with an embodiment, a unary gRPC method is the simplest type of service method. Typically a unary method takes a request value and returns a response value but this does not have to be the case, a unary method could just as easily take no request parameter and/or return no response. All of the signatures below are valid unary methods in Helidon gRPC MP.

```
// A unary method with a simple request and response
@io.helidon.microprofile.grpc.core.Unary
public ResponseType invoke(RequestType req)
// A unary method that just returns a response
@io.helidon.microprofile.grpc.core.Unary
public ResponseType invoke( )
// A unary method that takes a request but returns no response
@io.helidon.microprofile.grpc.core.Unary
public void invoke(RequestType req)
// A unary method that takes no request and returns no response
@io.helidon.microprofile.grpc.core.Unary
public void invoke( )
// An async unary request that takes a request and returns a future
// that will complete when the response is ready
@io.helidon.microprofile.grpc.core.Unary
public CompletableFuture<ResponseType> invoke(RequestType req)
// An async unary request that takes no request and returns a future
// that will complete when the response is ready
@io.helidon.microprofile.grpc.core.Unary
public CompletableFuture<ResponseType> invoke( )
// The standard gRPC Java unary method signature
@io.helidon.microprofile.grpc.core.Unary
public void invoke(RequestType req, StreamObserver<ResponseType> observer)
// The standard gRPC Java unary method signature but without a request type
@io.helidon.microprofile.grpc.core.Unary
public void invoke(StreamObserver<ResponseType> observer)
// A unary method that takes a request type and a future to complete
// with the response type
@io.helidon.microprofile.grpc.core.Unary
public void invoke(RequestType req, CompletableFuture<ResponseType> observer)
// A unary method that takes no request type but just takes a future
// to complete with the response type
@io.helidon.microprofile.grpc.core.Unary
public void invoke(CompletableFuture<ResponseType> observer)
```

In accordance with an embodiment, the various signatures supported above allow the service developer to choose the method signature that best fits their application business logic without needing to worry about handling standard gRPC Java requests and StreamObservers. The standard gRPC Java method signature is in the list above so it can still be used if required.

Server Streaming Methods

In accordance with an embodiment, a server streaming method receives a requests from the client and when the request stream is complete it sends back a stream of response values. A traditional gRPC Java server streaming method takes two parameters, the request and a StreamObserver that can be used to send back the single response in the same way that a unary method sends a response. As with unary methods Helidon gRPC MP supports different method signatures for server streaming methods.

All of the signatures below are valid server streaming methods in Helidon gRPC MP.

```
// The standard gRPC Java server streaming method signature
@io.helidon.microprofile.grpc.core.ServerStreaming
public void invoke(RequestType req, StreamObserver<ResponseType> observer)
// A server streaming method that uses a Stream to send the responses to the client
@io.helidon.microprofile.grpc.core.ServerStreaming
public Stream<ResponseType> invoke(RequestType req)
// The server streaming method without a request parameter
@io.helidon.microprofile.grpc.core.ServerStreaming
public void invoke(StreamObserver<ResponseType> observer)
// A server streaming method without a request parameter
// that uses a Stream to send the responses to the client
@io.helidon.microprofile.grpc.core.ServerStreaming
public Stream<ResponseType> invoke(RequestType req)
```

As with unary methods, the Helidon gRPC MP API supports multiple different method signatures for implementing server streaming methods.

Client Streaming Methods

In accordance with an embodiment, a client streaming method receives a stream of requests from the client and when the request stream is complete it sends back a response. A traditional gRPC Java client streaming method takes two StreamObserver parameters, one is the stream of client requests and the other can be used to send back the single response in the same way that a unary method sends a response. As with unary methods Helidon gRPC MP supports different method signatures for client streaming methods.

All of the signatures below are valid client streaming methods in Helidon gRPC MP.

```
// The standard gRPC Java client streaming method signature
@io.helidon.microprofile.grpc.core.ClientStreaming
public StreamObserver<RequestType> invoke(StreamObserver<ResponseType> observer)
// The gRPC Java client streaming method with an asynchronous response
@io.helidon.microprofile.grpc.core.ClientStreaming
public StreamObserver<RequestType> invoke(CompletableFuture<ResponseType> observer)
```

Bi-Directional Streaming Methods

In accordance with an embodiment, a bidirectional streaming method is a method that is a constant stream of client requests and server responses. Other than the standard gRPC Java StreamObserver there are not any other built in types that make sense to use to implement different method signatures for a bidirectional method so the only supported signature is the standard gRPC Java method.
@io.helidon.microprofile.grpc.core.Bidirectional
public StreamObserver<RequestType> invoke (StreamObserver<ResponseType> observer) Deploying Protobuf Services Whilst the examples above show how simple it is to write gRPC services with basic POJOs there may be cases where there is a requirement to deploy services built the traditional way using gRPC Java generated classes or built as non-microprofile Helidon gRCP services.

Annotate the Service Implementation

In accordance with an embodiment, when the gRPC MP server is starting it will discover all CDI beans of type io.grpc.BindableService. Service sub-classes implemented the traditional way with code generation are instances of BindableService so by annotating the implementation class with the @ApplicationScoped annotation they become discoverable and will be deployed into the gRPC server.

```
@ApplicationScoped
public class StringService
    extends StringServiceGrpc.StringServiceImplBase {
```

In the same way, if a class is an implementation of io.helidon.grpc.server.GrpcService then by annotating the class with the @ApplicationScoped annotation it will be discovered and deployed when the MP gRPC server starts.

```
@ApplicationScoped
public class StringService implements GrpcService {
```

Implement a GrpcMpExtension

In accordance with an embodiment, if it is not possible to annotate the service class (for example the code is built by a third party) another way to deploy none CDI bean services is to implement a gRPC MP server extension. The extension will then be called when the MP server is starting and be given the chance to add additional services for deployment. An extension should implement the io.helidon.microprofile.grpc.server.spi.GrpcMpExtension interface.

For example, assuming that there was a gRPC service class called StringService that needed to be deployed an extension class might look like this:

```
public class MyExtension
        implements GrpcMpExtension {
    @Override
    public void configure(GrpcMpContext context) {
        context.routing( )
```

-continued

```
                    .register(new ServiceService( ));
        }
    }
```

In accordance with the example illustrated above, the configure method of the extension will be called to allow the extension to add extra configuration to the server. In this example an instance of the Stringservice is registered with the routing. The GrpcMpExtension instances are discovered and loaded using the service loader so for the example above to work a file META-INF/services/io.helidon.microprofile.grpc.server.spi.GrpcMpExtension would need to be created that contained the names of the service implementations.

Helidon MP gRPC MicroProfile Clients

In accordance with an embodiment, Building Java gRPC clients using the Helidon MP gRPC APIs is very simple and removes a lot of the boiler plate code typically associated to more traditional approaches to writing gRPC Java clients. At its simplest a gRPC Java client can be written using nothing more than a suitably annotated interface.

Maven Coordinates

In accordance with an embodiment, Maven coordinates can be used to declare dependency management for applications. For example, the following dependency can be declared in a project:

```
<dependency>
    <groupId>io.helidon.microprofile.grpc</groupId>
    <artifactId>helidon-microprofile-grpc-client</artifactId>
</dependency>
```

Building a gRPC Client

In accordance with an embodiment, the steps to building and using a gRPC client in Helidon MP As described above, gRPC allows definition of various different types of service methods, such as, for example: unary RPC methods, wherein a client sends a single request to a server and receives a single response; server streaming RPC methods, wherein a client sends a request to a server and receives a stream of messages, and wherein gRPC guarantees message ordering within each RPC call; client streaming RPC methods, wherein a client writes a sequence of messages and sends those messages to a server; and then waits for the server to return a response, and wherein gRPC guarantees message ordering within each RPC call; or bidirectional streaming RPC methods, wherein both client and server send a sequence of messages using a read-write stream, and wherein the two streams operate independently, so that clients and servers can read and write in whichever order it is preferred.

In accordance with an embodiment, as with the server-side APIS, the Helidon MP gRPC client APIs support a number of different method signatures for each of the different gRPC method types.

Client Service Interface

In accordance with an embodiment, the next step is to produce an interface with the service methods that the client requires. For example, suppose we have a simple server side service that has a unary method to convert a string to uppercase; then a simple gRPC Service can be provided as:

```
@ApplicationScoped
@io.helidon.microprofile.grpc.core.Grpc
public interface StringService {
    @io.helidon.microprofile.grpc.core.Unary
    public String upper(String s) {
        return s == null ? null : s.toUpperCase( );
    }
}
```

In accordance with an embodiment, the service has been written using the Helidon MP APIs but could just as easily be a traditional gRPC Java service generated from protobuf files. The client API is agnostic of the server side implementation, it only cares about the method type, the request and response types and the type of Marshaller used to serialize the request and response.

To write a client for the StringService all that is required is an interface, for example, as a simple gRPC Service:

```
@ApplicationScoped
@io.helidon.microprofile.grpc.core.Grpc
public interface StringService {
    @io.helidon.microprofile.grpc.core.Unary
    public String upper(String s);
)
```

In accordance with an embodiment, the approach means there is no need to write any code to implement the client. The Helidon MP gRPC APIs will create a dynamic proxy for the interface using the information from the annotations and method signatures.

The interface in the example illustrated above uses the same method signature as the server but this does not have to be the case, the interface could have used any supported signature for a unary method, so for example it could just have easily been the standard unary method signature:

```
@ApplicationScoped
@io.helidon.microprofile.grpc.core.Grpc
public interface StringService {
    @io.helidon.microprofile.grpc.core.Unary
    public void upper(String s, StreamObserver<String> response);
}
```

We could also have made the client asynchronous by using one of the async method signatures:

```
@ApplicationScoped
@io.helidon.microprofile.grpc.core.Grpc
public interface StringService {
    @io.helidon.microprofile.grpc.core.Unary
    public CompletableFuture<String> upper(String s);
}
```

Configuring Channels

In accordance with an embodiment, for a gRPC client to connect to a server it requires a Channel. The Helidon MP gRPC APIs provide a way to inject channels into CDI beans that require them. Channels are configured in the grpc section of the Helidon application configuration. The examples below use an application.yaml file but there are many other ways to use and override configuration in Helidon application.yaml

```
grpc:
    channels:
        test-server:
            host: localhost
            port: 1408
```

In accordance with the example illustrated above, channels are configured in the 'channels' section; each sub-section is the Channel name that is then used to refer to this Channel in the software application code; each channel contains a host name and a port. While most client application only connect to a single server it is possible to configure multiple named channels if the client needs to connect to multiple servers.

```
grpc:
    channels:
        london:
            host: london.foo.com
            port: 1408
        new-york:
            host: ny.foo.com
            port: 1408
```

The above example shows two channel configurations, one named london and the other new-york.

Configuring TLS

It is also possible to configure a Channel to use TLS if the server is using TLS.

```
grpc:
    channels:
        test-server:
            host: localhost
            port: 1408
            tls:
                enabled: true
                tls-cert-path: /certs/foo.cert
                tls-key-path: /certs/foo.key
                tls-ca-cert-path: /certs/ca.cert
```

In accordance with the example above, the tis section of the channel configuration can be used to configure TLS. The enabled value can be used to enable or disable TLS for this channel. The tis-cert value is the location of the TLS certificate file. The tis-key value is the location of the TLS key file. The tis-ca-cert value is the location of the TLS CA certificate file. The SSL configuration uses the Helidon Resource class to locate configured keys and certificates.

In accordance with the example illustrated above the tis-cert-path config key has the -path suffix which tells the configuration to load/certs/foo.cert as a file. If/certs/foo.cert was a resource on the classpath the configuration key could have been changed to tis-cert-resource-path to load/certs/foo.cert from the classpath. The same applies to the tis-key and tis-ca-cert configuration keys. See the io.helidon.common.configurable.Resource class for details.

Using Channels

In accordance with an embodiment, once one or more channels have been configured they can be used by client code. The simplest way to use a channel is to inject it into beans using CDI. The Helidon gRPC client APIs have CDI producers that can provide io.grpc.Channel instances. For example, a class might have an injectable io.grpc.Channel field:

```
@Inject
@GrpcChannel (name="test-server")
private Channel channel;
```

In accordance with the example illustrated above, the @Inject annotation tells CDI to inject the channel. he @GrpcChannel annotation is the qualifier that supplies the Channel name. This is the same name as used in the channel configuration in the configuration examples above. When an instance of the CDI bean with the channel field is instantiated a channel will be injected into it.

The In-Process Channel

In accordance with an embodiment, if code is running in an application that is executing as part of a Helidon MP gRPC server there is a special in-process channel available. This allows code executing on the server to make calls to gRPC services deployed on that server in the same way an external client does. To inject an in-process channel a different qualifier annotation can be used.

```
@Inject
@InProcessGrpcChannel
private Channel channel;
```

In accordance with the example illustrated above, the @Inject annotation can be used the same as previously. The @InProcessGrpcChannel is the qualifier that can be used to tell the Helidon MP gRPC API to inject an in-process channel.

Using the Client Interface in an Application

In accordance with an embodiment, now that there is a client interface and a Channel configuration we can use these in the client application. The simplest way is to use the client in a CDI microprofile application.

In the software application class that requires the client we can declare a field of the same type as the client service interface. The field is then annotated so that CDI will inject the client proxy into the field.

```
@ApplicationScoped
public class Client {
    @Inject
    @GrpcProxy
    @GrpcChannel(name = "test-server")
    private StringService stringService;
```

In accordance with the example illustrated above, the @Inject annotation tells the CDI to inject the client implementation; the gRPC MP APIs have a bean provider that does this. The @GrpcProxy annotation can be used by the CDI container to match the injection point to the gRPC MP APIs provider. The @GrpcChannel annotation identifies the gRPC channel to be used by the client. The name used in the annotation refers to a channel name in the software application configuration.

Now when the CDI container instantiates instances of the Client it will inject a dynamic proxy into the stringService field and then any code in methods in the Client class can call methods on the StringService which will be translated to gRPC calls.

In accordance with the example illustrated above there is no need to directly use a Channel directly. The correct channel is added to the dynamic client proxy internally by the Helidon MP gRPC APIs.

Figure 10:
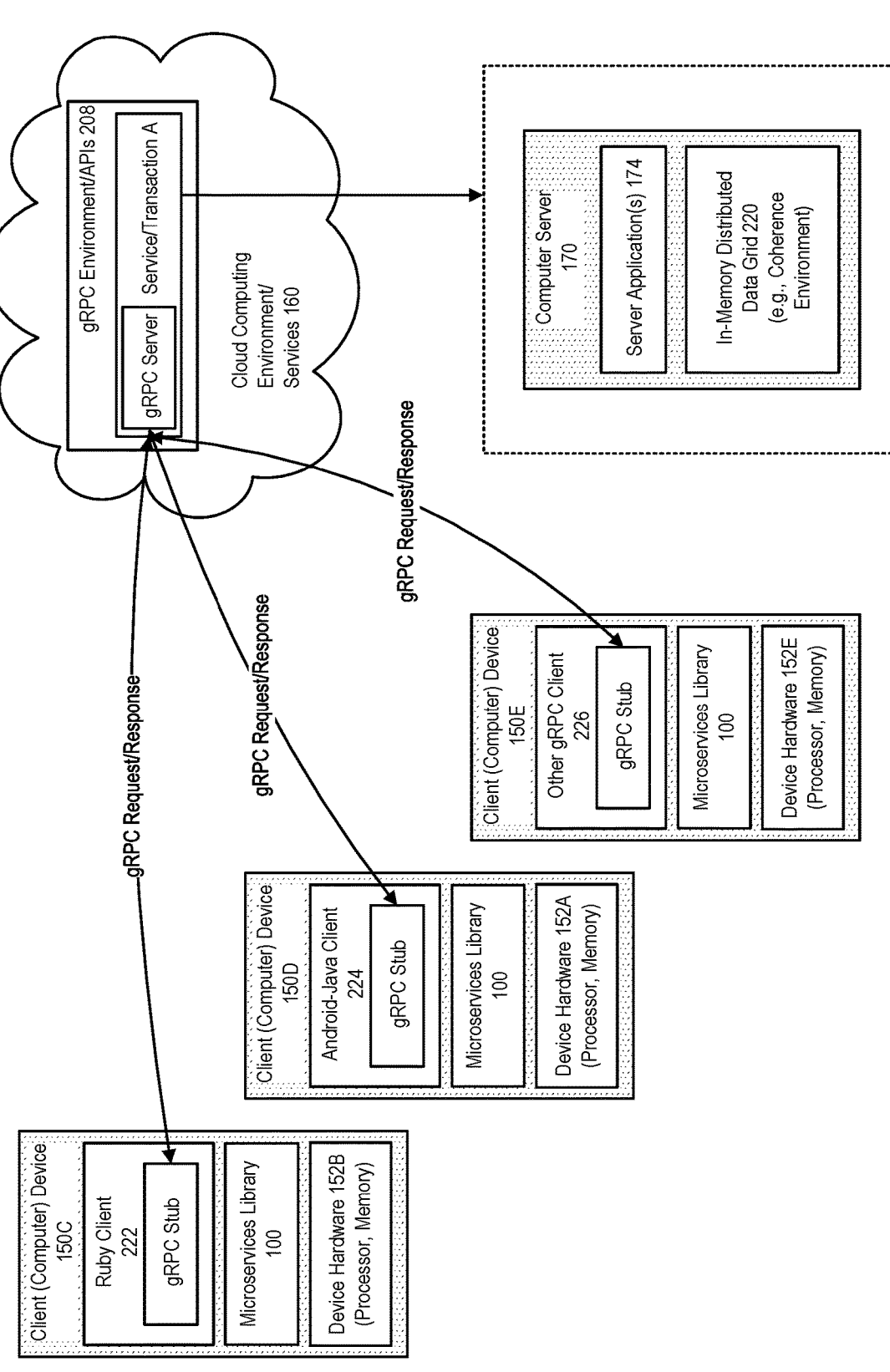
FIG. 10 further illustrates the use of gRPC in a microservices environment, in accordance with an embodiment.

FIG. 10 further illustrates the use of gRPC in a microservices environment, in accordance with an embodiment.

As illustrated in FIG. 10, in accordance with an embodiment, the system enables support for other types of clients beyond native Java clients or applications, such as, for example, Ruby 222, Android 224, or other types of client applications 226.

Figure 11:
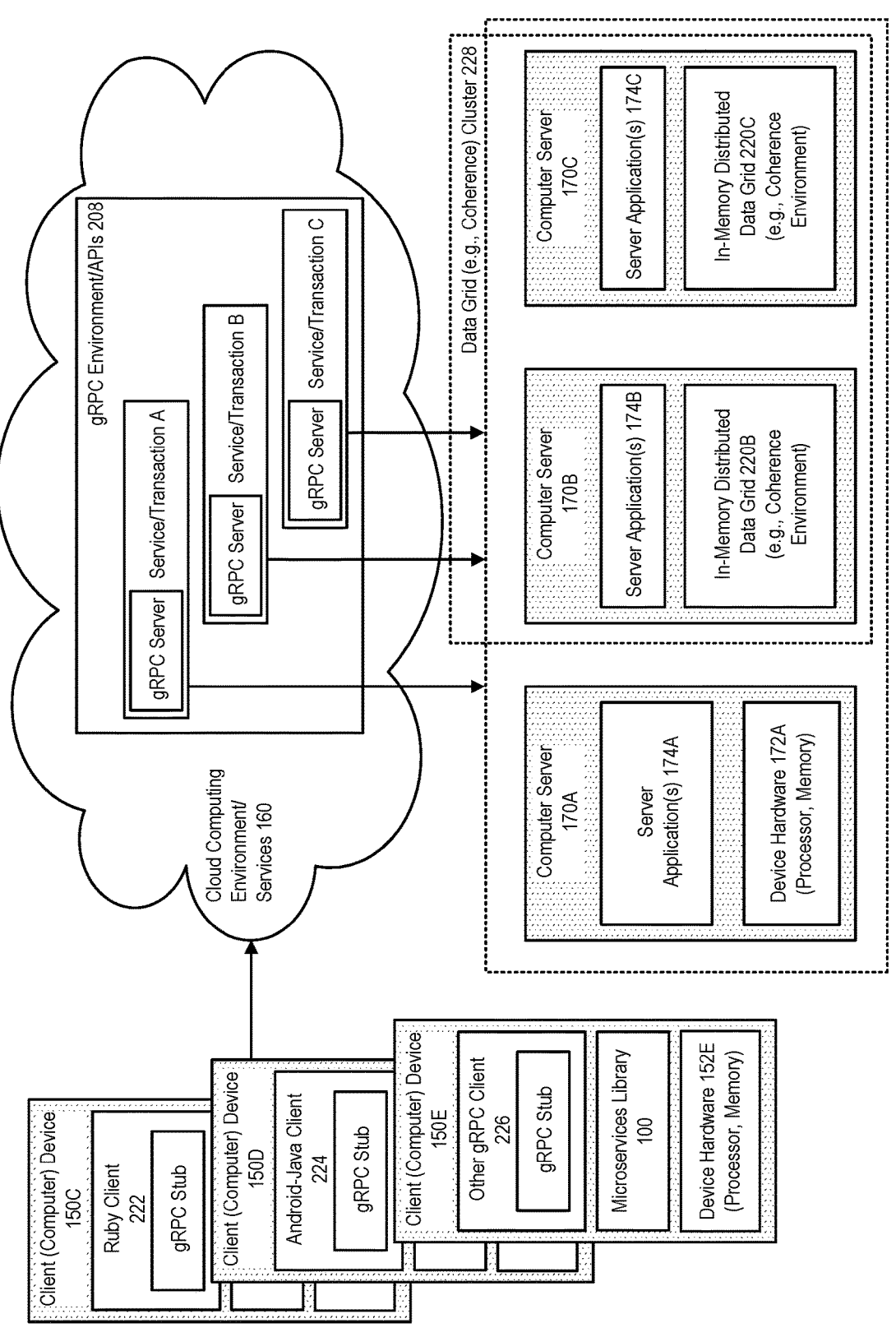
FIG. 11 further illustrates the use of gRPC in a microservices environment, in accordance with an embodiment.

FIG. 11 further illustrates the use of gRPC in a microservices environment, in accordance with an embodiment.

As illustrated in FIG. 11, in accordance with an embodiment, the system can be used, for example, to expose a Coherence API as a gRPC service, which in turn provides support for different types of clients to access the Coherence environment, including support for the different types of clients to connect to a Coherence cluster 228 via gRPC.

FIG. 12 illustrates a method for the use of gRPC in a microservices environment, in accordance with an embodiment.

As illustrated in FIG. 12, in accordance with an embodiment, at step 232, the method includes providing, at a computer including one or more processors and a memory, a microservices environment (microservices library) that provides a development framework that enables a software developer to create and use microservices.

In accordance with an embodiment, at step 234, the method includes providing, in association with the microservices environment, a remote procedure call (RPC) framework or component that enables client and server applications to communicate within the microservices environment.

In accordance with an embodiment, at step 236, the method includes enabling communication via the microservices environment remote procedure call (RPC) framework or component between clients and services and/or server applications associated with an in-memory data grid environment.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although various embodiments of the systems and methods described herein illustrate usage in a Helidon microservices environment, various embodiments can be used with other types of microservices environments or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for use of remote procedure calls in a microservices environments, comprising:

a computer including one or more processors, that provides access to a microservices environment for use with software applications; and a remote procedure call (RPC) framework provided at the microservices environment that provides one or more application programming interfaces (APIs) that enable a plurality of client computing devices, each client computing device running different client application types, and server applications, the server applications being associated with an in-memory data grid environment, of different types running at a server remote from the plurality of client computing devices to communicate, via a cloud computing service, within the microservices environment to build connected systems;

wherein a service definition enables the RPC framework provided at the microservices environment to provide one or more compiler plugins that generate client side and server side code, the client side code generated by the one or more compiler plugins provided by the RPC framework being implemented as a client side API at each of the plurality of client computing devices remote from the server, wherein the generated client side code generates a dynamic client-side proxy in response to annotations associated with service implementation classes at the RPC framework, and the server side code generated by the one or more compiler plugins provided by the RPC framework being implemented as a server side API, the server side API exposing a service of a server application running on the server;

wherein, upon the RPC framework provided at the microservices environment receiving a call from a client computing device of the plurality of client computing devices, the call comprising translations automatically performed by the generated dynamic client-side proxy, the call requesting the service of the server application running on the server and exposed by the server side API, the client computing device is associated with a RPC client within the RPC framework, the RPC framework provided at the microservices environment utilizing one or more buffers, along with the client side API and the server side API, to allow the client computing device to directly call the service as a local object by wrapping parameters for the call in a protocol buffer message type;

wherein the one or more buffers are defined by one or more files and comprise a series of name- value pairs; and wherein the server, upon receiving a call from the RPC framework, implements the requested method of the server application.

2. The system of claim 1, wherein the microservices environment is a Helidon environment, for use with one or more cloud computing or other environments.

3. The system of claim 1, wherein the client side API provides for load balancing, tracing, health checking, and authentication.

4. The system of claim 1, wherein the one or more buffers comprise protocol buffers, each protocol buffer providing a mechanism to serialize structure data.

5. The system of claim 1, wherein the client side API comprises an API associated with the in-memory data grid environment exposed as a service of the RPC framework.

6. A method for use of remote procedure calls in a microservices environments, comprising:

providing, at and in association with a microservices environment for use with software applications, a remote procedure call (RPC) framework that provides one or more application programming interfaces (APIs) that enable a plurality of client computing devices, each client computing device running different client application types, and server applications, the server applications being associated with an in-memory data grid environment, of different types running at a server remote from the plurality of client computing devices to communicate, via a cloud computing service, within the microservices environment to build connected systems;

wherein a service definition enables the RPC framework provided at the microservices environment to provide one or more compiler plugins that generate, client side and server side code, the client side code generated by the one or more compiler plugins provided by the RPC framework being implemented as a client side API at each of the plurality of client computing devices remote from the server, wherein the generated client side code generates a dynamic client-side proxy in response to annotations associated with service implementation classes at the RPC framework, and the server side code generated by the one or more compiler plugins provided by the RPC framework being implemented as a server side API, the server side API exposing a service of a server application running on the server;

wherein, upon the RPC framework provided at the microservices environment receiving a call from a client computing device of the plurality of client computing devices, the call comprising translations automatically performed by the generated dynamic client-side proxy, the call requesting the service of the server application running on the server and exposed by the server side API, the client computing device is associated with a RPC client within the RPC framework, the RPC framework provided at the microservices environment utilizing one or more buffers, along with the client side API and the server side API, to allow the client computing device to directly call the service as a local object by wrapping parameters for the call in a protocol buffer message type;

wherein the one or more buffers are defined by one or more files and comprise a series of name-value pairs; and wherein the server, upon receiving a call from the RPC framework, implements the requested method of the server application.

7. The method of claim 6, wherein the microservices environment is a Helidon environment, for use with one or more cloud computing or other environments.

8. The method of claim 6,
wherein the client side API provides for load balancing, tracing, health checking, and authentication.

9. The method of claim 6,
wherein the one or more buffers comprise protocol buffers, each protocol buffer providing a mechanism to serialize structure data.

10. The method of claim 6,
wherein the client side API comprises an API associated with the in-memory data grid environment exposed as a service of the RPC framework.

11. A non-transitory computer readable storage medium, including instructions stored thereon, which when read and executed by one or more computers cause the one or more computers to perform steps comprising:

providing, at and in association with a microservices environment for use with software applications, a remote procedure call (RPC) framework that provides one or more application programming interfaces (APIs) that enable a plurality of client computing devices, each client computing device running different client application types, and server applications, the server applications being associated with an in-memory data grid environment, of different types running at a server remote from the plurality of client computing devices to communicate, via a cloud computing service, within the microservices environment to build connected systems;

wherein a service definition enables the RPC framework provided at the microservices environment to provide one or more compiler plugins that generate, client side and server side code, the client side code generated by the one or more compiler plugins provided by the RPC framework being implemented as a client side API at each of the plurality of client computing devices remote from the server, wherein the generated client side code generates a dynamic client-side proxy in response to annotations associated with service implementation classes at the RPC framework, and the server side code generated by the one or more compiler plugins provided by the RPC framework being implemented as a server side API, the server side API exposing a service of a server application running on the server;

wherein, upon the RPC framework provided at the microservices environment receiving a call from a client computing device of the plurality of client computing devices, the call comprising translations automatically performed by the generated dynamic client-side proxy, the call requesting the service of the server application running on the server and exposed by the server side API, the client computing device is associated with a RPC client within the RPC framework, the RPC framework provided at the microservices environment utilizing one or more buffers, along with the client side API and the server side API, to allow the client computing device to directly call the service as a local object by wrapping parameters for the call in a protocol buffer message type;

wherein the one or more buffers are defined by one or more files and comprise a series of name-value pairs; and wherein the server, upon receiving a call from the RPC framework, implements the requested method of the server application.

12. The non-transitory computer readable storage medium of claim 11, wherein the microservices environment is a Helidon environment, for use with one or more cloud computing or other environments.

13. The non-transitory computer readable storage medium of claim 11,
wherein the client side API provides for load balancing, tracing, health checking, and authentication.

14. The non-transitory computer readable storage medium of claim 11,
wherein the one or more buffers comprise protocol buffers, each protocol buffer providing a mechanism to serialize structure data.

15. The non-transitory computer readable storage medium of claim 11,
wherein the client side API comprises an API associated with the in-memory data grid environment exposed as a service of the RPC framework.

* * * * *